(12) United States Patent
Kuroyama et al.

(10) Patent No.: US 9,537,536 B2
(45) Date of Patent: Jan. 3, 2017

(54) COMMUNICATION METHOD, PROGRAM STORAGE MEDIUM, MOBILE TERMINAL, HOME ELECTRIC APPLIANCE, AND HOME ELECTRIC APPLIANCE OPERATION SETTING SYSTEM

(71) Applicant: Panasonic Corporation, Kadoma-shi, Osaka (JP)

(72) Inventors: Kazuhiro Kuroyama, Osaka (JP); Kazunori Kurimoto, Hyogo (JP); Kenichi Kamon, Shiga (JP); Mariko Nakaso, Shiga (JP); Yuko Omura, Kyoto (JP); Tomotaka Yagi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/382,510

(22) PCT Filed: Feb. 13, 2013

(86) PCT No.: PCT/JP2013/000766
§ 371 (c)(1),
(2) Date: Sep. 2, 2014

(87) PCT Pub. No.: WO2013/132750
PCT Pub. Date: Sep. 12, 2013

(65) Prior Publication Data
US 2015/0017913 A1 Jan. 15, 2015

(30) Foreign Application Priority Data
Mar. 9, 2012 (JP) .................................. 2012-052773

(51) Int. Cl.
*H04B 5/00* (2006.01)
*G08C 17/00* (2006.01)
(Continued)

(52) U.S. Cl.
CPC ............. *H04B 5/0031* (2013.01); *G08C 17/00* (2013.01); *G08C 17/02* (2013.01);
(Continued)

(58) Field of Classification Search
None
See application file for complete search history.

(56) References Cited

U.S. PATENT DOCUMENTS

| 2002/0130834 A1* | 9/2002 | Madarasz | G08C 17/02 |
| | | | 345/156 |
| 2003/0103088 A1* | 6/2003 | Dresti | G06F 3/0481 |
| | | | 715/835 |

(Continued)

FOREIGN PATENT DOCUMENTS

| JP | 6-030239 Y2 | 1/1990 |
| JP | 6-335064 A | 12/1994 |

(Continued)

OTHER PUBLICATIONS

International Search Report in corresponding International Application No. PCT/JP2013/000766, dated Apr. 16, 2013, 2 pages.

*Primary Examiner* — Alejandro Rivero
(74) *Attorney, Agent, or Firm* — Brinks Gilson & Lione

(57) ABSTRACT

When an appliance communication portion of a home electric appliance receives a set operation data piece transmission request from a mobile terminal, the appliance communication portion transmits a stored set operation data piece. When the appliance communication portion receives the set operation data piece from the mobile terminal, the appliance communication portion sets an operation, defined by the (Continued)

received set operation data piece, as an operation of the home electric appliance to be executed. When a data piece processing portion of the mobile terminal receives a set operation data piece acquisition command from an input portion and receives the set operation data piece from the home electric appliance, the data piece processing portion causes a data piece storage portion to store the received set operation data piece. When the data piece processing portion receives an operation setting command from the input portion, the data piece processing portion causes a first terminal communication portion to transmit the set operation data piece.

18 Claims, 13 Drawing Sheets

(51) Int. Cl.
*H04L 12/28* (2006.01)
*G08C 17/02* (2006.01)
*H05B 37/02* (2006.01)

(52) U.S. Cl.
CPC .. *H04L 12/2838* (2013.01); *H04L 2012/2841* (2013.01); *H05B 37/0272* (2013.01)

(56) References Cited

U.S. PATENT DOCUMENTS

| | | |
|---|---|---|
| 2005/0140506 A1 | 6/2005 | Oh et al. |
| 2005/0159823 A1* | 7/2005 | Hayes ................... G05B 15/02 700/19 |
| 2011/0114716 A1* | 5/2011 | Pratt ................... H04L 12/2814 235/375 |
| 2012/0206245 A1 | 8/2012 | Uno |

FOREIGN PATENT DOCUMENTS

| | | |
|---|---|---|
| JP | 2001-241229 A | 9/2001 |
| JP | 2002-064886 A | 2/2002 |
| JP | 2002-165285 A | 6/2002 |
| JP | 2005-020650 A | 1/2005 |
| JP | 2005-100223 A | 4/2005 |
| JP | 2007-288290 A | 11/2007 |
| JP | 2008-085959 A | 4/2008 |

* cited by examiner

COMMUNICATION METHOD, PROGRAM STORAGE MEDIUM, MOBILE TERMINAL, HOME ELECTRIC APPLIANCE, AND HOME ELECTRIC APPLIANCE OPERATION SETTING SYSTEM

This application is a 371 application of PCT/JP2013/000766 having an international filing date of Feb. 13, 2013, which claims priority to JP 2012-052773 filed Mar. 9, 2012, the entire contents of which are incorporated herein by reference.

TECHNICAL FIELD

The present invention relates to a home electric appliance operation setting system, and particularly to a system configured to set operations of a home electric appliance by using a mobile terminal.

BACKGROUND ART

Conventionally known is a home electric appliance in which a user can register frequently-used manipulations and from which the user can call up the registered manipulations to reutilize them when necessary.

For example, according to an electronic apparatus disclosed in PTL 1, manipulation contents are registered by alternately pushing down a registration key and manipulation key of a remote handling equipment. Then, by manipulating a title selection key, the registered manipulation is called up to be executed.

CITATION LIST

Patent Literature

PTL 1: Japanese Laid-Open Patent Application Publication No. 6-335064

SUMMARY OF INVENTION

Technical Problem

In recent years, as the functions of the home electric appliances increase, the home electric appliances each including a function to register frequently-used manipulations among a larger number of functions in the home electric appliance and call up the registered manipulations to reutilize them when necessary are increasing. However, a procedure to register the frequently-used manipulations and a procedure to call up the registered manipulations vary among conventional home electric appliances. Therefore, the manipulation method is difficult to remember and complicated.

Solution to Problem

A home electric appliance operation setting system according to an aspect of the present invention includes: one or more home electric appliances; and a mobile terminal connected to said one or more home electric appliances via near field communication, wherein: each of the home electric appliances includes an operation setting portion configured to store a data piece, which defines a certain operation of the home electric appliance, to set the operation, defined by the data piece, as an operation to be executed, a manipulating portion configured to be manipulated by a user to cause the operation setting portion to set the operation to be executed, an appliance control portion configured to cause the home electric appliance to execute the operation (hereinafter referred to as a "set operation"), which has been set, in accordance with a data piece (hereinafter referred to as a "set operation data piece") that defines the set operation, and an appliance communication portion configured to communicate with a first terminal communication portion of the mobile terminal via the near field communication; the mobile terminal includes the first terminal communication portion configured to communicate with the appliance communication portion of the home electric appliance via the near field communication, an input portion to which the user inputs a set operation data piece acquisition command and an operation setting command; a data piece processing portion configured to process data pieces depending on the set operation data piece acquisition command or the operation setting command input through the input portion, and a data piece storage portion configured to store the data pieces processed by the data piece processing portion; the appliance communication portion of the home electric appliance is configured such that in a case where the appliance communication portion has received a connection request, and when the appliance communication portion receives a set operation data piece transmission request from the mobile terminal, the appliance communication portion transmits the stored set operation data piece, when the appliance communication portion receives both the set operation data piece and an identification information piece from the mobile terminal or receives only the set operation data piece, the appliance communication portion causes the operation setting portion to store the received set operation data piece to set the operation, defined by the received set operation data piece, as the operation of the home electric appliance to be executed, and in a predetermined case, the appliance communication portion transmits an identification information piece of the home electric appliance to which the appliance communication portion belongs; the data piece processing portion of the mobile terminal is configured such that when the data piece processing portion receives the set operation data piece acquisition command from the input portion, the data piece processing portion causes the first terminal communication portion to transmit the connection request, when the data piece processing portion receives the set operation data piece and the identification information piece from the home electric appliance through the first terminal communication portion, the data piece processing portion causes the received set operation data piece and the received identification information piece to be associated with each other and causes the data piece storage portion to store them, and when the data piece processing portion receives the operation setting command from the input portion, the data piece processing portion causes the first terminal communication portion to transmit the connection request and causes the first terminal communication portion to transmit both the set operation data piece and the identification information piece, which have been stored in the data piece storage portion and associated with each other, or only the set operation data piece; and the data piece processing portion of the mobile terminal confirms at the time of transmission that or the appliance communication portion confirms at the time of reception that the identification information piece associated with the set operation data piece received by the appliance communication portion and stored in the operation setting portion coincides with the identification information piece of the home electric appliance to which the appliance communication portion belongs.

Advantageous Effects of Invention

The present invention is configured as explained above and has an effect of being able to easily register a frequently-used operation setting in a plurality of home electric appliances by the same manipulation procedure and easily call up the registered operation setting by the same manipulation procedure.

The above object, other objects, features, and advantages of the present invention will be made clear by the following detailed explanation of preferred embodiments with reference to the attached drawings.

DETAILED DESCRIPTION OF THE PREFERRED EMBODIMENTS

Figure 1:
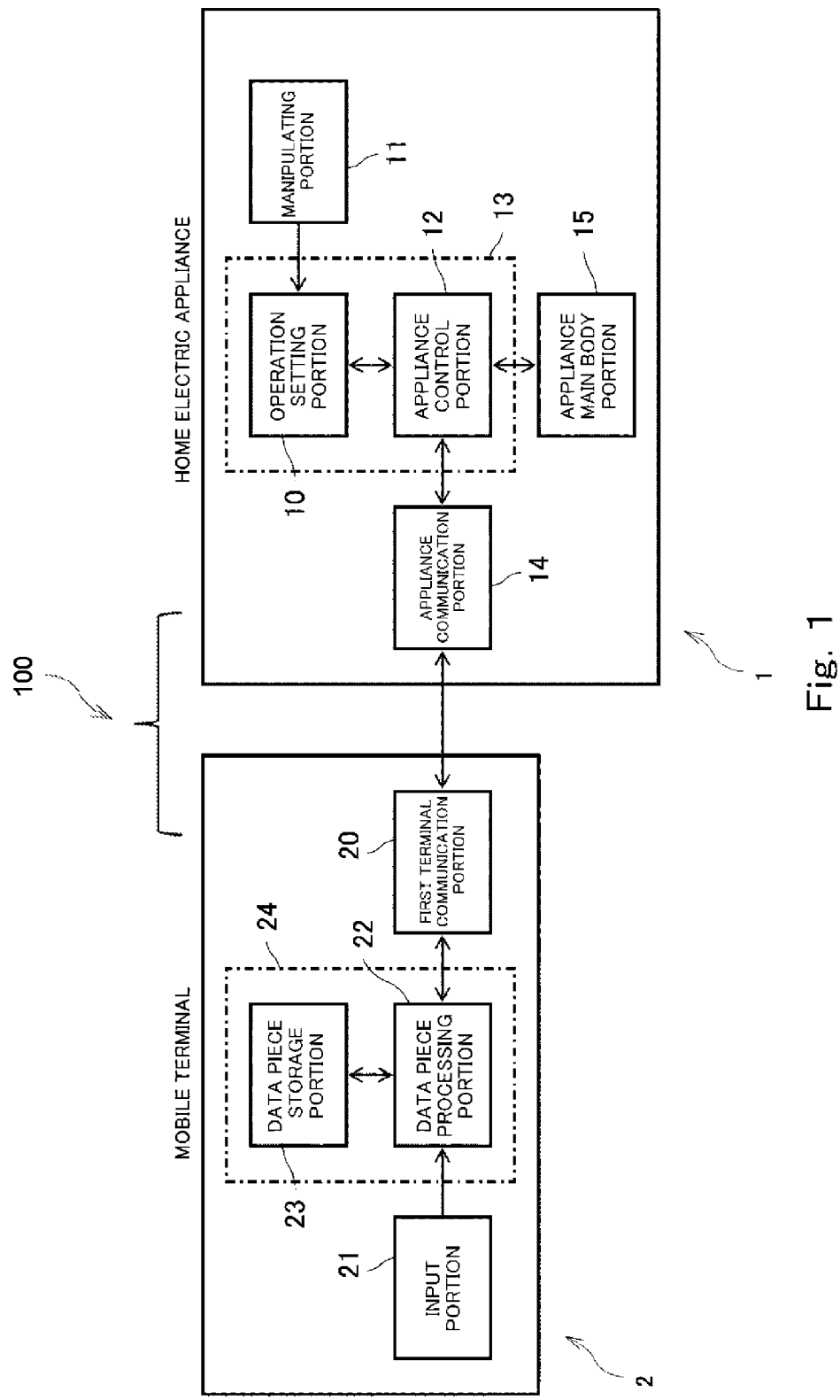
FIG. 1 is a functional block diagram showing the configuration of a home electric appliance operation setting system according to Embodiment 1 of the present invention.

A home electric appliance operation setting system according to an embodiment of the present invention includes: one or more home electric appliances; and a mobile terminal connected to said one or more home electric appliances via near field communication, wherein: each of the home electric appliances includes an operation setting portion configured to store a data piece, which defines a certain operation of the home electric appliance, to set the operation, defined by the data piece, as an operation to be executed, a manipulating portion configured to be manipulated by a user to cause the operation setting portion to set the operation to be executed, an appliance control portion configured to cause the home electric appliance to execute the operation (hereinafter referred to as a "set operation"), which has been set, in accordance with a data piece (hereinafter referred to as a "set operation data piece") that defines the set operation, and an appliance communication portion configured to communicate with a first terminal communication portion of the mobile terminal via the near field communication; the mobile terminal includes the first terminal communication portion configured to communicate with the appliance communication portion of the home electric appliance via the near field communication, an input portion to which the user inputs a set operation data piece acquisition command and an operation setting command; a data piece processing portion configured to process data pieces depending on the set operation data piece acquisition command or the operation setting command input through the input portion, and a data piece storage portion configured to store the data pieces processed by the data piece processing portion; the appliance communication portion of the home electric appliance is configured such that in a case where the appliance communication portion has received a connection request, and when the appliance communication portion receives a set operation data piece transmission request from the mobile terminal, the appliance communication portion transmits the stored set operation data piece, when the appliance communication portion receives both the set operation data piece and an identification information piece from the mobile terminal or receives only the set operation data piece, the appliance communication portion causes the operation setting portion to store the received set operation data piece to set the operation, defined by the received set operation data piece, as the operation of the home electric appliance to be executed, and in a predetermined case, the appliance communication portion transmits an identification information piece of the home electric appliance to which the appliance communication portion belongs; the data piece processing portion of the mobile terminal is configured such that when the data piece processing portion receives the set operation data piece acquisition command from the input portion, the data piece processing portion causes the first terminal communication portion to transmit the connection request, when the data piece processing portion receives the set operation data piece and the identification information piece from the home electric appliance through the first terminal communication portion, the data piece processing portion causes the received set operation data piece and the received identification information piece to be associated with each other and causes the data piece storage portion to store them, and when the data piece processing portion receives the operation setting command from the input portion, the data piece processing portion causes the first terminal communication portion to transmit the connection request and causes the first terminal communication portion to transmit both the set operation data piece and the identification information piece, which have been stored in the data piece storage portion and associated with each other, or only the set operation data piece; and the data piece processing portion of the mobile terminal confirms at the time of transmission that or the appliance communication portion confirms at the time of reception that the identification information piece associated with the set operation data piece received by the appliance communication portion and stored in the operation setting portion coincides with the identification information piece of the home electric appliance to which the appliance communication portion belongs.

According to this configuration, by causing the mobile terminal to contact each home electric appliance, the operation setting can be registered in the mobile terminal. Thus, the frequently-used operation setting can be easily registered in the home electric appliances by the same manipulation procedure. Further, by causing the mobile terminal to contact each home electric appliance, the registered operation setting can be called up. Thus, the registered operation setting can be easily called up from the plurality of home electric appliances by the same manipulation procedure.

In the home electric appliance operation setting system, the data piece processing portion of the mobile terminal may be configured such that in a case where the data piece processing portion has transmitted the connection request, and the identification information piece, received from the appliance communication portion, of the home electric appliance to which the appliance communication portion belongs and the identification information piece associated with the set operation data piece to be transmitted coincide with each other, the data piece processing portion transmits the set operation data piece.

According to this configuration, the data piece processing portion of the mobile terminal confirms at the time of the transmission that the identification information piece associated with the set operation data piece coincides with the identification information piece of the home electric appliance to which the appliance communication portion belongs. Therefore, the set operation data piece can be prevented from being mistakenly transmitted to a different appliance, so that the misoperation of the appliance can be prevented.

The home electric appliance operation setting system may be configured such that when the identification information piece received by the appliance communication portion together with the set operation data piece coincides with the identification information piece of the home electric appliance to which the appliance communication portion belongs, the appliance communication portion causes the operation setting portion to store the received set operation data piece.

According to this configuration, the appliance communication portion of the home electric appliance confirms at the time of the reception that the identification information piece associated with the set operation data piece coincides with the identification information piece of the home electric appliance to which the appliance communication portion belongs. Therefore, the set operation data piece can be prevented from being mistakenly transmitted to a different appliance, so that the misoperation of the appliance can be prevented.

The home electric appliance operation setting system may be configured such that: the input portion of the mobile terminal is configured to receive the operation setting command together with a selection information piece that selects the set operation data piece stored in the data piece storage portion; and when the data piece processing portion of the mobile terminal receives from the input portion the set operation data piece acquisition command together with the selection information piece, the data piece processing portion causes the first terminal communication portion to transmit the connection request and causes the first terminal communication portion to transmit the set operation data piece selected based on the selection information piece from the set information pieces stored in the data piece storage portion and the identification information piece associated with the selected set operation data piece.

According to this configuration, the set operation can be selected.

The home electric appliance operation setting system may be configured such that: the input portion is configured to receive a set operation data piece identification information piece that allows the user to identify the set operation data piece stored in the data piece storage portion; and the data piece processing portion of the mobile terminal is configured to cause the received set operation data piece, the received identification information piece, and the set operation data piece identification information piece, received from the input portion, to be associated with one another and cause the data piece storage portion to store them.

According to this configuration, the set operation can be selected based on the set operation data piece identification information piece.

The home electric appliance operation setting system may be configured such that: the appliance communication portion of the home electric appliance is configured such that when the appliance communication portion receives the set operation data piece transmission request from the mobile terminal, the appliance communication portion encrypts the stored set operation data piece to transmit it, and when the appliance communication portion receives the encrypted set operation data piece from the mobile terminal, the appliance communication portion decrypts the received, encrypted set operation data piece and causes the operation setting portion to store it to set the operation, defined by the received set operation data piece, as the operation of the home electric appliance to be executed; and the data piece processing portion of the mobile terminal is configured such that when the data piece processing portion receives the encrypted set operation data piece and the identification information piece from the home electric appliance through the first terminal communication portion, the data piece processing portion causes the received, encrypted set operation data piece and the received identification information piece to be associated with each other and causes the data piece storage portion to store them, and when the data piece processing portion receives the operation setting command from the input portion, the data piece processing portion causes the first terminal communication portion to transmit the connection request and causes the first terminal communication portion to transmit both the encrypted set operation data piece and the identification information piece, which have been stored in the data piece storage portion and associated with each other, or only the encrypted set operation data piece.

According to this configuration, the set operation data piece can be prevented from being rewritten in the mobile terminal.

The home electric appliance operation setting system may be configured to further include a server connected via a network, wherein: the mobile terminal includes a second terminal communication portion connected to the network; when the data piece processing portion of the mobile terminal receives the set operation data piece acquisition command from the input portion, the data piece processing portion transmits the operation setting data piece and the identification information piece, which have been associated with each other, to the server through the second terminal communication portion and the network; and when the server receives the operation setting data piece and the identification information piece that have been associated with each other, the server stores the operation setting data piece and the identification information piece that have been associated with each other.

According to this configuration, the set operation data piece can be prevented from being damaged by the malfunction of the mobile terminal or the like.

Hereinafter, embodiments of the present invention will be explained in reference to the drawings.

In the following explanations and drawings, the same reference signs are used for the same or corresponding components, and a repetition of the same explanation is avoided.

Embodiment 1

Configuration

FIG. 1 is a functional block diagram showing the configuration of a home electric appliance operation setting system 100.

The home electric appliance operation setting system 100 includes one or more home electric appliances 1 and a mobile terminal 2. The mobile terminal 2 is connected to one or more home electric appliances 1 via near field communication.

The near field communication is wireless communication in which a radio wave reach distance is short (about several meters). The near field communication is realized in a state where the mobile terminal 2 and one or more home electric appliances 1 are located close to each other or contact each other. For example, in the case of wireless LAN communication of Wi-Fi in which the radio wave reach distance is long (about several tens of meters to several hundreds of meters), there is a high possibility that in a range where signals output from the home electric appliance 1 and the mobile terminal 2 reach, the other wireless LAN communication apparatus exists. Therefore, after a procedure (authentication) in which a connection destination is selected in the mobile terminal 2, and the selected home electric appliance 1 and the mobile terminal 2 confirm each other unique identification information pieces given to respective appliances, one-to-one data transmission and reception are realized. However, according to the near field communication, the radio wave reach distance is defined such that the other near field communication apparatus does not exist in the range where the signals output from the home electric appliance 1 and the mobile terminal 2 reach. With this, the connection destination is specified by causing the mobile terminal 2 to get close to or contact the home electric appliance 1 without the procedure (authentication) in which the connection destination is selected in the mobile terminal 2, and the selected home electric appliance 1 and the mobile terminal 2 confirm each other the unique identification information pieces given to respective appliances. Thus, one-to-one data transmission and reception are realized. Therefore, it is possible to prevent, for example, a case where a user makes a mistake in selecting the connection destination in the mobile terminal 2, and as a result, an operation setting of an unintended appliance is acquired, or the operation setting of the unintended appliance is called up. However, the present embodiment is not limited to this. The data transmission and reception may be performed after the procedure of the confirmation of the unique identification information pieces given to respective appliances.

Each of the home electric appliances 1 includes an operation setting portion 10, a manipulating portion 11, an appliance control portion 12, an appliance communication portion 14, and an appliance main body portion 15. Examples of the home electric appliance 1 include microwave ovens, washing machines, lighting devices, and hard disk recorders. However, the present embodiment is not limited to these. Further, the home electric appliance 1 may include an apparatus (such as a remote controller) connected to a main body of the home electric appliance 1 via wired or wireless communication.

The operation setting portion 10 stores a data piece (hereinafter may be referred to as an "operation data piece") that defines a certain operation of the home electric appliance 1. With this, the home electric appliance 1 sets the operation, defined by the operation data piece, as an operation to be executed by the home electric appliance 1. Here, the phrase "operation to be executed" includes: an operation executed in real time in a state where the home electric appliance 1 is operating and an operation executed next; and an operation to be executed in a case where the home electric appliance 1 is started up next. This setting function can be realized such that, for example, the operation setting portion 10 includes: a storage portion that stores a plurality of operation data pieces; and a control portion that specifies one operation data piece to be executed from the plurality of operation data pieces stored in the storage portion. One example of this specifying operation is a reservation operation in which: the user manipulates the manipulating portion 11 to input a selection command that selects any one of the plurality of operation data pieces stored in the storage portion; and the control portion specifies the operation data piece, selected by the selection command, as one operation data piece to be executed. The appliance control portion 12 may be configured to have this function of the control portion. For example, the above-described setting function can be realized such that: the operation setting portion 10 includes a storage portion that stores only one operation data piece; and the appliance control portion 12 executes the operation defined by this operation data piece stored in the storage portion. For example, the storage portion that stores only one operation data piece can be realized such that one predetermined storage area of a memory is overwritten with the operation data piece one after another.

Examples of the data piece that defines a certain operation of the home electric appliance 1 include not only a data piece that defines a single operation of the home electric appliance 1 but also a data piece that defines a plurality of operations executed in a predetermined order (or simultaneously) by the home electric appliance 1. Hereinafter, the operation that has been set is referred to as a set operation, and the data piece that defines the set operation is referred to as a set operation data piece.

The manipulating portion 11 is manipulated by a user to cause the operation setting portion 10 to set the operation to be executed. To be specific, the manipulation of the manipulating portion 11 by the user is converted by the cooperation of the manipulating portion 11 and the operation setting portion 10 into the data piece that defines the operation of the home electric appliance 1, and the data piece is stored in the operation setting portion 10 to be set as the operation to be executed by the home electric appliance 1. Examples of the manipulating portion 11 include a button, a dial, and a touch panel. However, the present embodiment is not limited to these.

The appliance control portion 12 causes the appliance main body portion 15 of the home electric appliance 1 to execute the set operation in accordance with the set operation data piece set in the operation setting portion 10. In a case where the set operation data piece stored in the operation setting portion 10 is the data piece that defines the plurality of operations, the appliance control portion 12 executes the plurality of operations, defined by the set operation data piece, in an order defined by the set operation data piece or in a predetermined order (or simultaneously).

The operation setting portion 10 and the appliance control portion 12 constitute an appliance control unit 13. The appliance control unit 13 is constituted by, for example, a control unit including a calculating portion and a storage portion. The control unit is constituted by a microcontroller, a CPU, a MPU, a logic circuit, a PLC (Programmable Logic Controller), or the like. The appliance control unit 13 may be constituted by a single control unit that performs centralized control or a plurality of control units that perform distributed control. For example, the appliance control portion 12 and the operation setting portion 10 may be constituted by a single control unit and a program stored in the control unit or may be constituted by two control units that operate in cooperation with each other.

The appliance communication portion 14 communicates with a first terminal communication portion 20 of the mobile terminal 2 via the near field communication. One example of the appliance communication portion 14 is a wireless interface module including a communication portion and a communication control portion configured to control the communication portion. However, the present embodiment is not limited to this. For example, the appliance communication portion 14 may be constituted by a communication apparatus and a control portion realized by a program that is stored in the appliance control unit 13 and controls the communication apparatus.

In a case where the appliance communication portion 14 receives a connection request from the mobile terminal 2 and also receives a set operation data piece transmission request, the appliance communication portion 14 transmits the stored set operation data piece. In addition, the communication between the mobile terminal 2 and the appliance communication portion 14 is realized by responding to the connection request, and then, the communication regarding predetermined processing is performed. In a predetermined case, the appliance communication portion 14 transmits the identification information piece of the home electric appliance 1 to which the appliance communication portion 14 belongs. The "identification information piece of the home electric appliance 1" contains both the identification information piece of the home electric appliance 1 itself and the identification information piece of the appliance communication portion 14. Examples of the predetermined case include a case related to the transmission of the set operation data piece and a case related to the confirmation of coincidence of the identification information piece in the below-described mobile terminal 2. In the case related to the transmission of the set operation data piece, the appliance communication portion 14 transmits the identification information piece of the home electric appliance 1 to which the appliance communication portion 14 belongs, and a trigger for the transmission may be the connection request or the set operation data piece transmission request. Transmitting the identification information piece in response to the connection request may be the "authentication". Further, the appliance communication portion 14 may transmit the identification information piece in response to an identification information piece transmission request transmitted from the mobile terminal 2. In the case related to the confirmation of the coincidence of the identification information piece in the mobile terminal 2, the appliance communication portion 14 transmits the identification information piece of the home electric appliance 1 to which the appliance communication portion 14 belongs, and examples of the trigger for the transmission include the connection request and the below-described identification information piece transmission request.

When the appliance communication portion 14 receives both the set operation data piece and the identification information piece or only the set information piece from the mobile terminal 2, the appliance communication portion 14 causes the operation setting portion 10 to store the received set operation data piece. Thus, the appliance communication portion 14 sets the data piece as the operation to be executed by the home electric appliance 1.

The mobile terminal 2 includes the first terminal communication portion 20, an input portion 21, a data piece processing portion 22, and a data piece storage portion 23. Examples of the mobile terminal 2 include mobile phones (especially, so-called smartphones having touch panels); apparatuses (such as remote controllers) connected to the main body of the home electric appliance 1 via the wired or wireless communication; and dedicated mobile terminals excluding functions other than functions related to the functions of the present invention. However, the present embodiment is not limited to this. In addition, the mobile terminals are not limited to terminals that are carried at all times and may be terminals that can be carried.

The first terminal communication portion 20 communicates with the appliance communication portion 14 of the home electric appliance 1 via the near field communication. One example of the first terminal communication portion 20 is a NFC reader/writer module. However, the present embodiment is not limited to this. For example, the first terminal communication portion 20 may be constituted by a communication apparatus and a control portion realized by a program that is stored in the below-described control unit and controls the communication apparatus.

The input portion 21 is a portion to which the user inputs the set operation data piece acquisition command and the operation setting command. Examples of the input portion 21 include a button, a dial, and a touch panel. However, the present embodiment is not limited to this.

The data piece processing portion 22 processes data pieces in accordance with the set operation data piece acquisition command and operation setting command input from the input portion 21.

When the data piece processing portion 22 receives the set operation data piece acquisition command from the input portion 21, the data piece processing portion 22 causes the first terminal communication portion 20 to transmit the connection request.

When the data piece processing portion 22 receives the set operation data piece and the identification information piece from the home electric appliance 1 through the first terminal communication portion 20, the data piece processing portion 22 causes the received set operation data piece and the received identification information piece to be associated with each other and causes the data piece storage portion 23 to store them.

Further, when the data piece processing portion 22 receives the operation setting command from the input portion 21, the data piece processing portion 22 causes the first terminal communication portion 20 to transmit the connection request and also causes the first terminal communication portion 20 to transmit both the set operation data piece and identification information piece, which have been stored in the data piece storage portion 23 and associated with each other, or only the set information piece.

As above, the data piece processing portion 22 processes the data pieces in accordance with the set operation data piece acquisition command and operation setting command input from the input portion 21. The data piece processing portion 22 is constituted by, for example, a calculating portion of a below-described control unit.

The data piece storage portion 23 stores the data pieces processed by the data piece processing portion 22. For example, the data piece storage portion 23 is constituted by a storage portion, such as a ROM or a RAM, of the below-described control unit.

The data piece storage portion 23 may be configured to be able to store the received set operation data piece itself.

The data piece processing portion 22 and the data piece storage portion 23 constitute a terminal control unit 24. For example, the terminal control unit 24 is constituted by a control unit including a calculating portion and a storage portion, and the data piece processing portion 22 and the data piece storage portion 23 are respectively constituted by the calculating portion and the storage portion. For example, the control unit is constituted by a microcontroller, a CPU, a MPU, a logic circuit, a PLC, or the like.

Then, the data piece processing portion 22 of the mobile terminal 2 confirms at the time of the transmission or the appliance communication portion 14 of the home electric appliance 1 confirms at the time of the reception that the identification information piece associated with the set operation data piece received by the appliance communication portion 14 and stored in the operation setting portion 10 coincides with the identification information piece of the home electric appliance 1 to which the appliance communication portion 14 belongs. With this, the set operation data piece can be prevented from being mistakenly transmitted to a different appliance, so that the misoperation of the appliance can be prevented.

For example, that the data piece processing portion 22 of the mobile terminal 2 confirms at the time of the transmission that the identification information piece associated with the set operation data piece coincides with the identification information piece of the home electric appliance 1 to which the appliance communication portion 14 belongs denotes that: when the data piece processing portion 22 of the mobile terminal 2 receives the operation setting command from the input portion 21, the data piece processing portion 22 causes the first terminal communication portion 20 to transmit the connection request; and when the data piece processing portion 22 receives the identification information piece of the home electric appliance 1 through the first terminal communication portion 20, the data piece processing portion 22 determines whether or not the identification information piece stored in the data piece storage portion 23 and the received identification information piece coincide with each other. As described above, the appliance communication portion 14 may be configured to transmit the identification information piece in response to the identification information piece transmission request transmitted separately from the connection request. Then, when the data piece processing portion 22 of the mobile terminal 2 determines that the received identification information piece of the home electric appliance 1 coincides with the identification information piece stored in the data piece storage portion 23, the data piece processing portion 22 causes the first terminal communication portion 20 to transmit the connection request and also causes the first terminal communication portion 20 to transmit the set operation data piece that has been stored in the data piece storage portion 23 and associated with the identification information piece.

In contrast, for example, that the appliance communication portion 14 of the home electric appliance 1 confirms at the time of the reception that the identification information piece associated with the set operation data piece coincides with the identification information piece of the home electric appliance 1 to which the appliance communication portion 14 belongs denotes that when the appliance communication portion 14 of the home electric appliance 1 receives the identification information piece and the set operation data piece from the mobile terminal 2, the appliance communication portion 14 determines whether or not the received identification information piece and the identification information piece of the home electric appliance 1 to which the appliance communication portion 14 belongs coincide with each other. Then, when the appliance communication portion 14 of the home electric appliance 1 determines that the received identification information piece of the home electric appliance 1 and the identification information piece stored in the data piece storage portion 23 coincide with each other, the appliance communication portion 14 causes the operation setting portion 10 to store the received set operation data piece and sets the set operation, defined by the received set operation data piece, as the operation of the home electric appliance 1 to be executed in a case where the home electric appliance 1 is started up next.

Next, operation examples of the home electric appliance operation setting system configured as above will be explained. The following will separately explain a case (Operation Example 1) where the confirmation of the coincidence of the identification information pieces is performed in the mobile terminal 2 and a case (Operation Example 2) wherein it is performed in the home electric appliance 1

Operation Example 1

Figure 2:
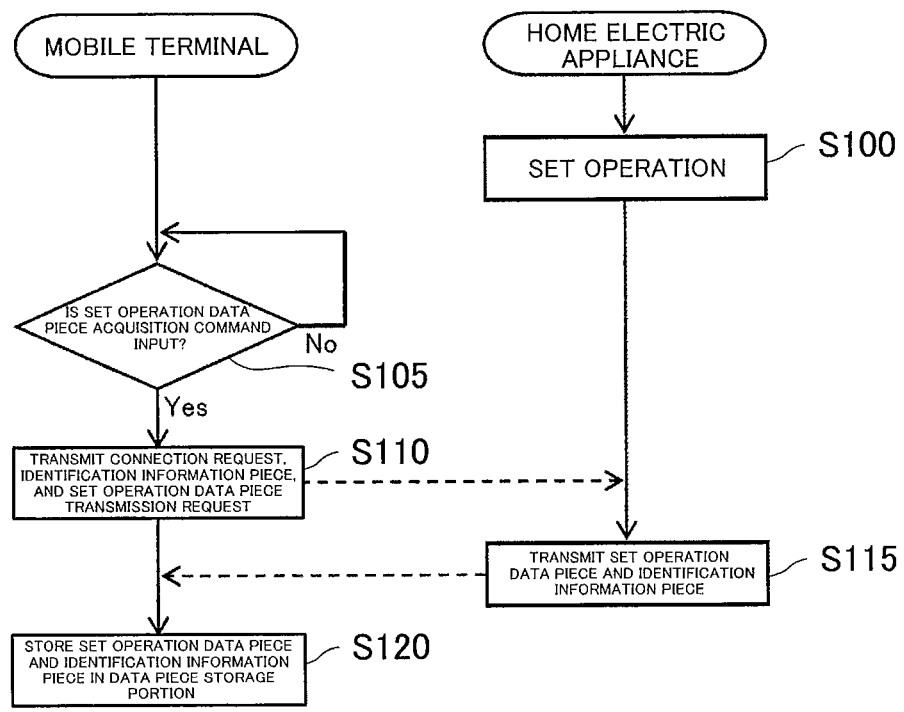
FIG. 2 is a flow chart showing Operation Example 1 in a case where a set operation data piece acquisition command is input in the home electric appliance operation setting system according to Embodiment 1 of the present invention.

FIG. 2 is a flow chart showing Operation Example 1 in a case where the set operation data piece acquisition command is input in the home electric appliance operation setting system according to Embodiment 1 of the present invention.

First, an operation example in a case where the set operation data piece acquisition command is input through the input portion 21 of the mobile terminal 2 in the home electric appliance operation setting system 100 configured as above will be explained in reference to FIG. 2. Operation Example 1 is an operation example in which the data piece processing portion 22 of the mobile terminal 2 confirms at the time of the transmission that the identification information piece associated with the set operation data piece coincides with the identification information piece of the home electric appliance 1 to which the appliance communication portion 14 belongs.

First, the user manipulates the manipulating portion 11 in accordance with a normal procedure to set the operation of the home electric appliance 1. With this, the set operation data piece that defines the set operation is stored in the operation setting portion to be set as the operation to be executed (Step S100).

Next, when the user manipulates the input portion 21 of the mobile terminal 2 to input the set operation data piece acquisition command through the input portion 21 (Yes in Step S105), and the user causes the mobile terminal 2 to contact the desired home electric appliance 1 (or the user causes the mobile terminal 2 to get close to the desired home electric appliance 1), the data piece processing portion 22 of the mobile terminal 2 causes the first terminal communication portion 20 to transmit the connection request. Further, the data piece processing portion 22 causes the first terminal communication portion 20 to transmit the set operation data piece transmission request and the identification information piece transmission request (Step S110). The transmission request, the set operation data piece transmission request, and the identification information piece transmission request may be transmitted as a single command or as a plurality of commands.

Next, when the appliance communication portion 14 of the home electric appliance 1 receives the connection request and the set operation data piece transmission request from the mobile terminal 2, the appliance communication portion 14 transmits the set operation data piece stored in the operation setting portion 10. Here, since the set operation data piece (data piece that defines an operation set as the operation to be executed next) is a single data piece, the set operation data piece to be transmitted does not have to be specified in the mobile terminal 2. Therefore, the configuration of transmitting the set operation data piece is made simpler than conventional examples. In addition, the appliance communication portion 14 transmits the identification information piece of the home electric appliance 1 to which the appliance communication portion 14 belongs (Step S115). These command responses may be transmitted as a single command response or as a plurality of command responses. A timing for the response is arbitrary.

Next, when the data piece processing portion 22 of the mobile terminal 2 receives the set operation data piece and the identification information piece from the home electric appliance 1 through the first terminal communication portion 20, the data piece processing portion 22 causes the received set operation data piece and the identification information piece to be associated with each other and causes the data piece storage portion 23 to store them (Step S120). With this, the set operation of the home electric appliance 1 is registered in the mobile terminal 2.

Figure 3:
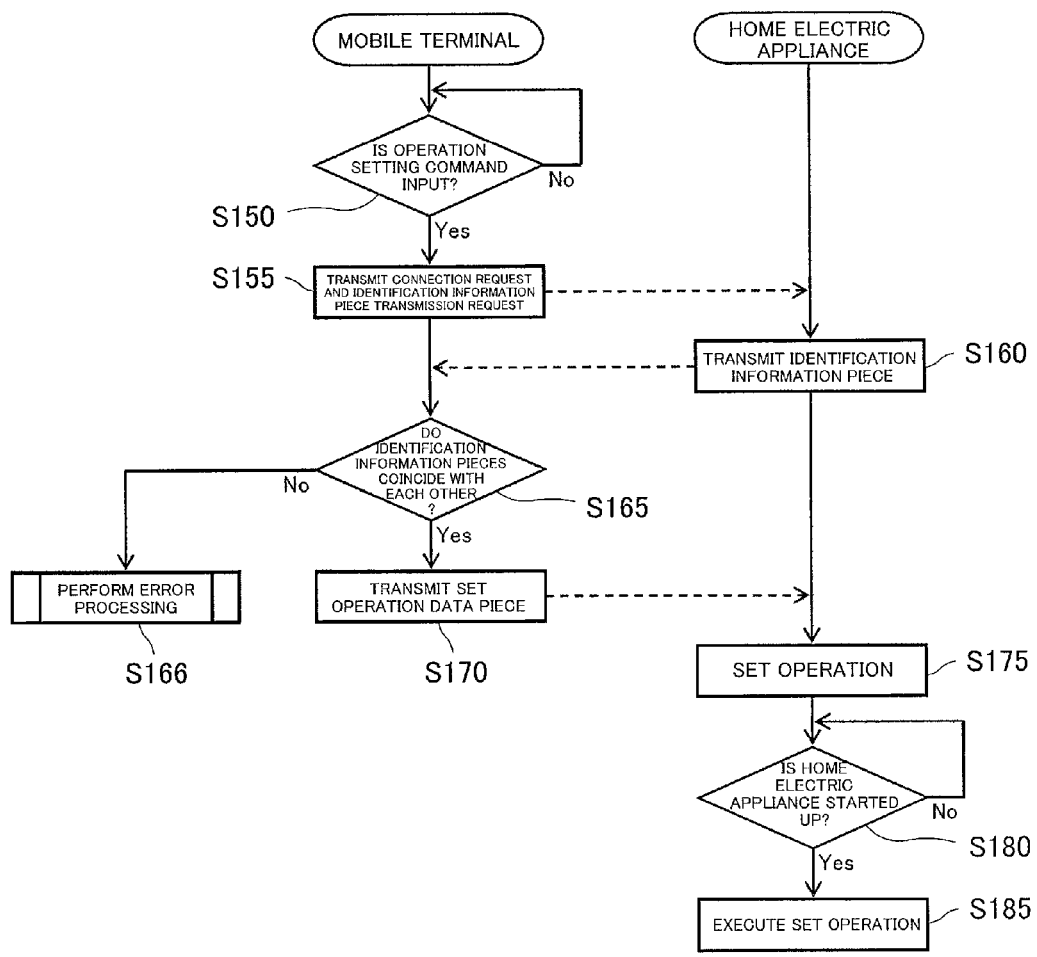
FIG. 3 is a flow chart showing Operation Example 1 in a case where an operation setting command is input in the home electric appliance operation setting system according to Embodiment 1 of the present invention.

FIG. 3 is a flow chart showing Operation Example 1 in a case where the operation setting command is input in the home electric appliance operation setting system according to Embodiment 1 of the present invention.

Next, an operation example in a case where the operation setting command is input through the input portion 21 of the mobile terminal 2 in the home electric appliance operation setting system 100 configured as above will be explained in reference to FIG. 3.

First, when the user manipulates the input portion 21 of the mobile terminal 2 to input the operation setting command through the input portion 21 (Yes in Step S150), and the user causes the mobile terminal 2 to contact the home electric appliance 1 (or the user causes the mobile terminal 2 to get close to the desired home electric appliance 1), the data piece processing portion 22 causes the first terminal communication portion 20 to transmit the connection request. Further, the data piece processing portion 22 causes the first terminal communication portion 20 to transmit the identification information piece transmission request (Step S155). The connection request and the identification information piece transmission request may be transmitted as a single command or as a plurality of commands.

Next, the appliance communication portion 14 of the home electric appliance 1 transmits the identification information piece of the home electric appliance 1 to which the appliance communication portion 14 belongs (Step S160). The identification information piece transmission request from the mobile terminal 2 may be omitted, and the appliance communication portion 14 may be configured to transmit, in response to the connection request, the identification information piece of the home electric appliance 1 to which the appliance communication portion 14 belongs.

Next, when the data piece processing portion 22 of the mobile terminal 2 receives the identification information piece of the home electric appliance 1 through the first terminal communication portion 20, the data piece processing portion 22 determines whether or not the received identification information piece and the identification information piece stored in the data piece storage portion 23 coincide with each other (Step S165).

When the data piece processing portion 22 of the mobile terminal 2 determines that the received identification information piece of the home electric appliance 1 and the identification information piece stored in the data piece storage portion 23 coincide with each other (Yes in Step S165), the data piece processing portion 22 causes the first terminal communication portion 20 to transmit the set operation data piece that has been stored in the data piece storage portion 23 and associated with the identification information piece (Step S170).

In contrast, when the data piece processing portion 22 of the mobile terminal 2 determines that the received identification information piece of the home electric appliance 1 and the identification information piece stored in the data piece storage portion 23 do not coincide with each other (No in Step S165), the data piece processing portion 22 performs predetermined error processing (Step S166).

As above, the data piece processing portion 22 of the mobile terminal 2 confirms at the time of the transmission that the identification information piece associated with the set operation data piece received by the appliance communication portion 14 and stored in the operation setting portion 10 coincides with the identification information piece of the home electric appliance 1 to which the appliance communication portion 14 belongs.

Next, when the appliance communication portion 14 of the home electric appliance 1 receives the set operation data piece from the mobile terminal 2, the appliance communication portion 14 causes the operation setting portion 10 to store the received set operation data piece and sets the set operation, defined by the received set operation data piece, as the operation of the home electric appliance 1 to be executed in a case where the home electric appliance 1 is started up next (Step S175). With this, the set operation registered in the mobile terminal 2 can be called up.

In the above-described control, after desired processing that follows after the connection request is executed in the mobile terminal 2, the connection of the mobile terminal 2 with the appliance communication portion 14 is cut at a suitable timing. The same is true in the following embodiments and examples.

Next, when the home electric appliance 1 is started up (Yes in Step S180), the appliance control portion 12 causes the appliance main body portion 15 of the home electric appliance 1 to execute the set operation in accordance with the set operation data piece stored in the operation setting portion 10 (Step S185).

When the home electric appliance 1 is operating in Step S185, the operation that has been set is executed.

According to the above configuration, the user manipulates the mobile terminal 2 to input the set operation data piece acquisition command, and the user causes the mobile terminal 2 to contact the home electric appliance 1 to which the user is about to register the operation setting (or the user causes the mobile terminal 2 to get close to the home electric appliance 1 to which the user is about to register the operation setting). With this, the home electric appliance 1 to which the user is about to register the operation setting is specified, and the set operation data piece set such that the user manipulates the manipulating portion 11 of the home electric appliance 1 in accordance with a normal procedure is automatically acquired and stored in the mobile terminal 2. With this, the operation setting can be registered in the mobile terminal 2. In addition, the user manipulates the mobile terminal 2 to input the operation setting command, and the user causes the mobile terminal 2 to contact the home electric appliance 1 from which the user is about to call up the operation setting (or the user causes the mobile terminal 2 to get close to the home electric appliance 1 from which the user is about to call up the operation setting). With this, the home electric appliance 1 from which the user is about to call up the operation setting is specified. Thus, the registered set operation data piece is automatically transmitted to the specified home electric appliance 1, and the operation defined by the set operation data piece is set. With this, the operation setting registered in the mobile terminal 2 can be called up. Therefore, by causing the mobile terminal 2 to contact the respective home electric appliances 1, the operation setting can be registered in the mobile terminal 2. Thus, the frequently-used operation settings can be easily registered in the home electric appliances 1 in accordance with the same manipulation procedure. Further, by causing the mobile terminal 2 to contact the respective home electric appliances 1, the registered operation setting can be called up. Therefore, the registered operation settings can be easily called up from a plurality of home electric appliances 1 in accordance with the same manipulation procedure.

The data piece processing portion 22 of the mobile terminal 2 confirms at the time of the transmission that the identification information piece associated with the set operation data piece received by the appliance communication portion 14 and stored in the operation setting portion 10 coincides with the identification information piece of the home electric appliance 1 to which the appliance communication portion 14 belongs. With this, the set operation data piece can be prevented from being mistakenly transmitted to a different appliance, so that the misoperation of the appliance can be prevented.

Operation Example 2

Figure 4:
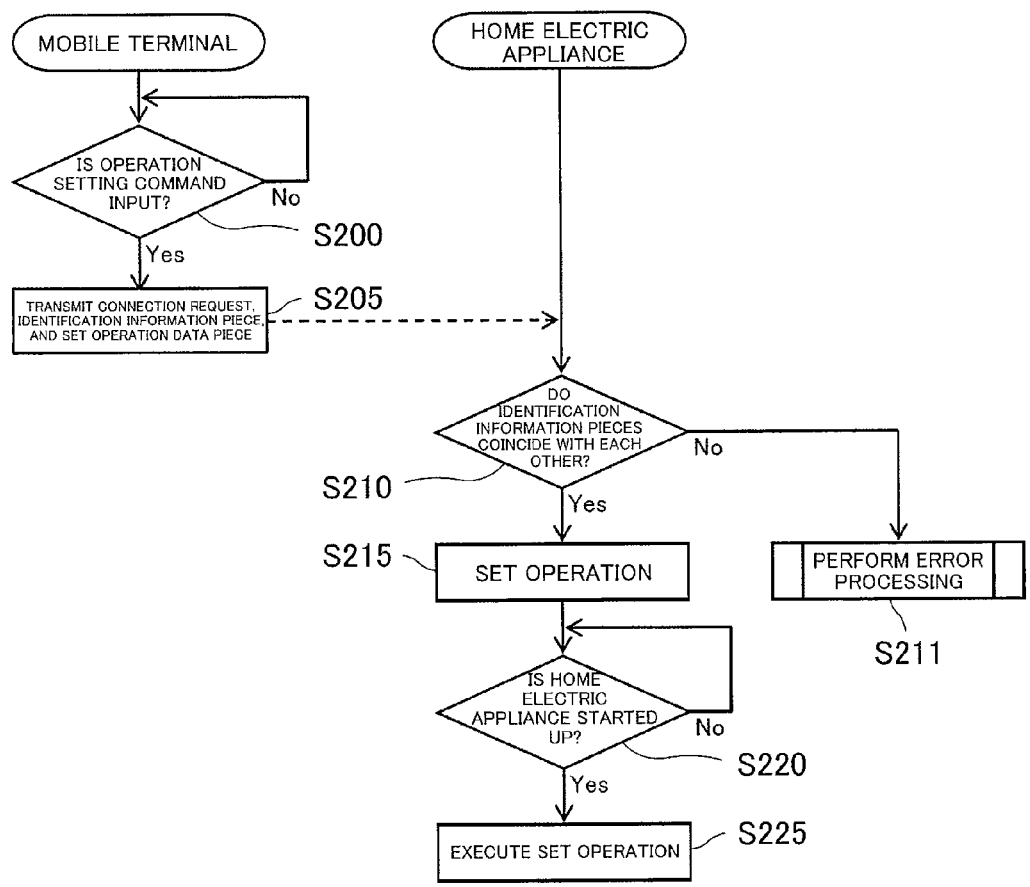
FIG. 4 is a flow chart showing Operation Example 2 in a case where the set operation data piece acquisition command is input in the home electric appliance operation setting system according to Embodiment 1 of the present invention.

FIG. 4 is a flow chart showing Operation Example 2 in a case where the operation setting command is input in the home electric appliance operation setting system according to Embodiment 1 of the present invention.

Operation Example 2 is an operation example in which the appliance communication portion 14 of the home electric appliance 1 confirms at the time of the reception that the identification information piece associated with the set operation data piece coincides with the identification information piece of the home electric appliance 1 to which the appliance communication portion 14 belongs.

Since an operation example in a case where the set operation data piece acquisition command is input through the input portion 21 of the mobile terminal 2 is the same as Operation Example 1 described above, an explanation thereof is omitted.

An operation example in a case where the operation setting command is input through the input portion 21 of the mobile terminal 2 in the home electric appliance operation setting system configured as above will be explained in reference to FIG. 4.

First, when the user manipulates the input portion 21 of the mobile terminal 2 to input the operation setting command through the input portion 21 (Yes in Step S200), and the user causes the mobile terminal 2 to contact the home electric appliance 1 (or the user causes the mobile terminal 2 to get close to the desired home electric appliance 1), the data piece processing portion 22 causes the first terminal communication portion 20 to transmit the connection request. Further, the data piece processing portion 22 causes the first terminal communication portion 20 to transmit the identification information piece and set operation data piece that are associated with each other and stored in the data piece storage portion 23 (Step S205). The connection request, the identification information piece, and the set operation data piece may be transmitted as a single command or as a plurality of commands.

Next, when the appliance communication portion 14 of the home electric appliance 1 receives the identification information piece and the set operation data piece from the mobile terminal 2, the appliance communication portion 14 determines whether or not the received identification information piece and the identification information piece of the home electric appliance 1 to which the appliance communication portion 14 belongs coincide with each other (Step S210).

When the appliance communication portion 14 of the home electric appliance 1 determines that the received identification information piece of the home electric appliance 1 and the identification information piece stored in the data piece storage portion 23 coincide with each other (Yes in Step S210), the appliance communication portion 14 causes the operation setting portion 10 to store the received set operation data piece and sets the set operation, defined by the received set operation data piece, as the operation of the home electric appliance 1 to be executed in a case where the home electric appliance 1 is started up next (Step S215).

In contrast, when the data piece processing portion 22 of the mobile terminal 2 determines that the received identification information piece of the home electric appliance 1 and the identification information piece stored in the data piece storage portion 23 do not coincide with each other (No in Step S210), the data piece processing portion 22 performs the predetermined error processing (Step S211).

As above, the appliance communication portion 14 of the home electric appliance 1 confirms at the time of the reception that the identification information piece associated with the set operation data piece received by the appliance communication portion 14 and stored in the operation setting portion 10 coincides with the identification information piece of the home electric appliance 1 to which the appliance communication portion 14 belongs.

Next, when the home electric appliance 1 is started up (Yes in Step S220), the appliance control portion 12 causes the appliance main body portion 15 of the home electric appliance 1 to execute the set operation in accordance with the set operation data piece stored in the operation setting portion 10 (Step S225).

When the home electric appliance 1 is operating in Step S225, the operation that has been set is executed.

According to the above configuration, the appliance communication portion 14 of the home electric appliance 1 confirms at the time of the reception that the identification information piece associated with the set operation data piece received by the appliance communication portion 14 and stored in the operation setting portion 10 coincides with the identification information piece of the home electric appliance 1 to which the appliance communication portion 14 belongs. With this, the set operation data piece can be prevented from being mistakenly transmitted to a different appliance, so that the misoperation of the appliance can be prevented.

Embodiment 2

The following will explain the configurations and operations of Embodiment 2 and mainly explain differences between Embodiment 2 and Embodiment 1.
Configuration The input portion 21 of the mobile terminal 2 of Embodiment 2 is configured to be able to receive a set operation data piece identification information piece that allows the user to identify the set operation data piece stored in the data piece storage portion 23.

The mobile terminal 2 of Embodiment 2 is configured to cause the received set operation data piece, the identification information piece, and the set operation data piece identification information piece, input through the input portion 21, to be associated with one another and cause the data piece storage portion 23 to store them.

With this, by reference to the set operation data piece identification information piece associated with the set operation data piece, the user can recognize the contents of the set operation according to the set operation data piece.

Further, the input portion 21 of the mobile terminal 2 of Embodiment 2 is configured to receive the operation setting command together with a selection information piece that selects the set operation data piece stored in the data piece storage portion 23.

When the data piece processing portion 22 of the mobile terminal 2 of Embodiment 2 receives the set operation data piece acquisition command together with the selection information piece from the input portion 21, the data piece processing portion 22 causes the first terminal communication portion 20 to transmit the connection request and causes the first terminal communication portion 20 to transmit the set operation data piece selected by the selection information piece from the set information pieces stored in the data piece storage portion 23 and the identification information piece associated with the selected set operation data piece.

With this, the user can set the set operation according to the selected set operation data piece as the operation to be executed by the home electric appliance 1.

Operation Example

Figure 5:
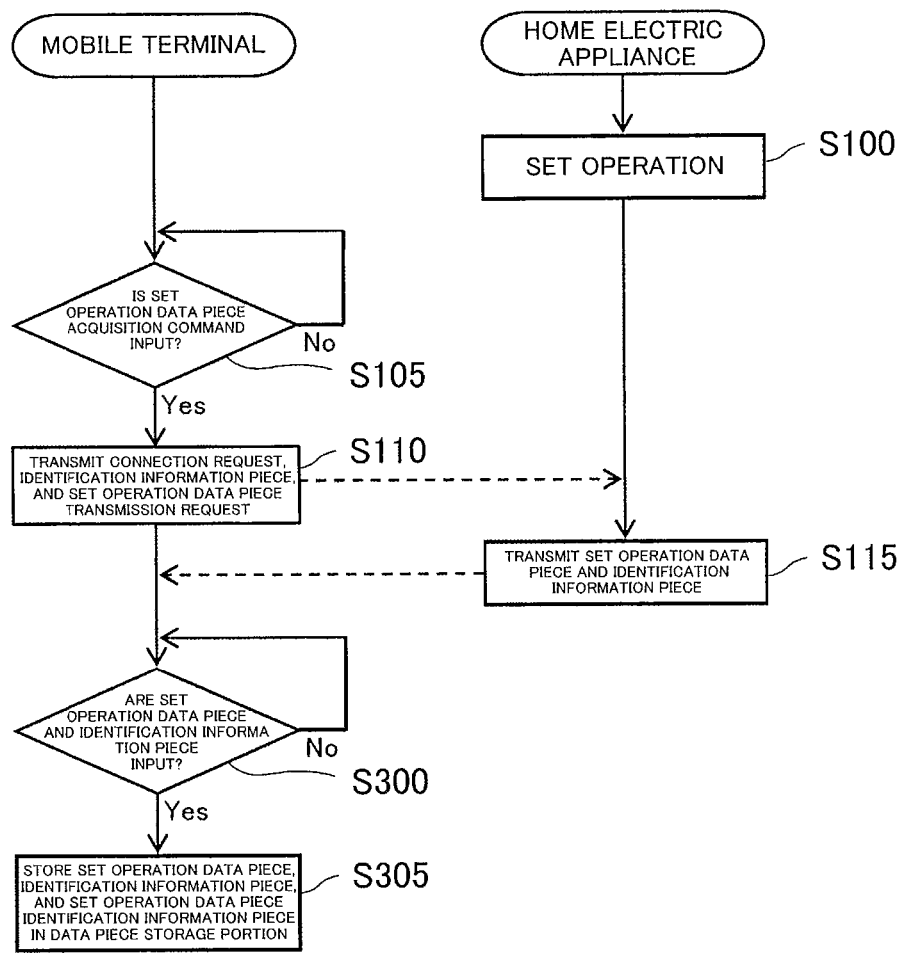
FIG. 5 is a flow chart showing an operation example in a case where the set operation data piece acquisition command is input in the home electric appliance operation setting system according to Embodiment 2 of the present invention.

FIG. 5 is a flow chart showing an operation example in a case where the set operation data piece acquisition command is input in the home electric appliance operation setting system according to Embodiment 2 of the present invention.

First, Steps S100 to S115 are executed in order. However, since these steps are the same as Steps S100 to S115 of the above embodiment, the same reference signs are used, and explanations thereof are omitted.

After Step S115, when the data piece processing portion 22 of the mobile terminal 2 receives the set operation data piece and the identification information piece from the home electric appliance 1 through the first terminal communication portion 20 and receives the set operation data piece identification information piece from the input portion 21 (Step S300), the data piece processing portion 22 causes the received set operation data piece, the received identification information piece, and the received set operation data piece identification information piece to be associated with each other and causes the data piece storage portion 23 to store them (Step S305).

Figure 6:
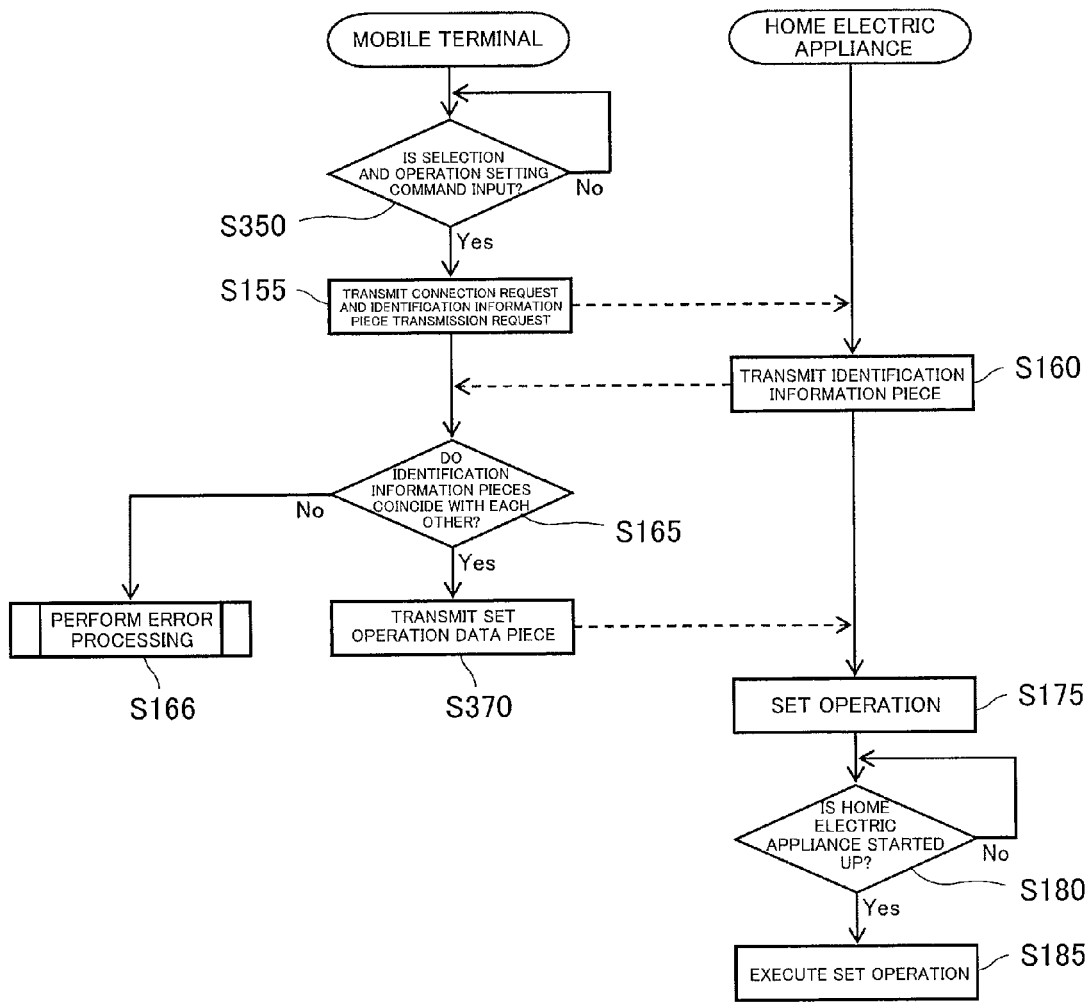
FIG. 6 is a flow chart showing an operation example in a case where the operation setting command is input in the home electric appliance operation setting system according to Embodiment 2 of the present invention.

FIG. 6 is a flow chart showing an operation example in a case where the operation setting command is input in the home electric appliance operation setting system according to Embodiment 2 of the present invention.

Next, an operation example in a case where the operation setting command is input through the input portion 21 of the mobile terminal 2 in the home electric appliance operation setting system 100 configured as above will be explained in reference to FIG. 6.

First, the data piece processing portion 22 of the mobile terminal 2 stands by until the data piece processing portion 22 receives from the input portion 21 the operation setting command together with the selection information piece that selects the set operation data piece stored in the data piece storage portion 23 (Step S350).

When the operation setting command is input, the same steps as Steps S155 to S160 of Embodiment 1 are performed, so that explanations thereof are omitted.

When the data piece processing portion 22 of the mobile terminal 2 determines that the received identification information piece of the home electric appliance 1 and the identification information piece stored in the data piece storage portion 23 coincide with each other (Yes in Step S165), the data piece processing portion 22 causes the first terminal communication portion 20 to transmit the connection request. Further, the data piece processing portion 22 of the mobile terminal 2 causes the first terminal communication portion 20 to transmit the set operation data piece, specified by the operation setting command input together with the selection information piece, among the set operation data pieces stored in the data piece storage portion 23 and associated with the identification information pieces (Step S370).

In contrast, when the data piece processing portion 22 of the mobile terminal 2 determines that the received identification information piece of the home electric appliance 1 and the identification information piece stored in the data piece storage portion 23 do not coincide with each other (No in Step S365), the data piece processing portion 22 performs the predetermined error processing as with Embodiment 1 (Step S166).

After Step S370, Steps S175 to S185 are executed in order. Since these steps are the same as Steps S175 to S185 of Embodiment 1, the same reference signs are used, and explanations thereof are omitted.

Embodiment 3

Figure 7:
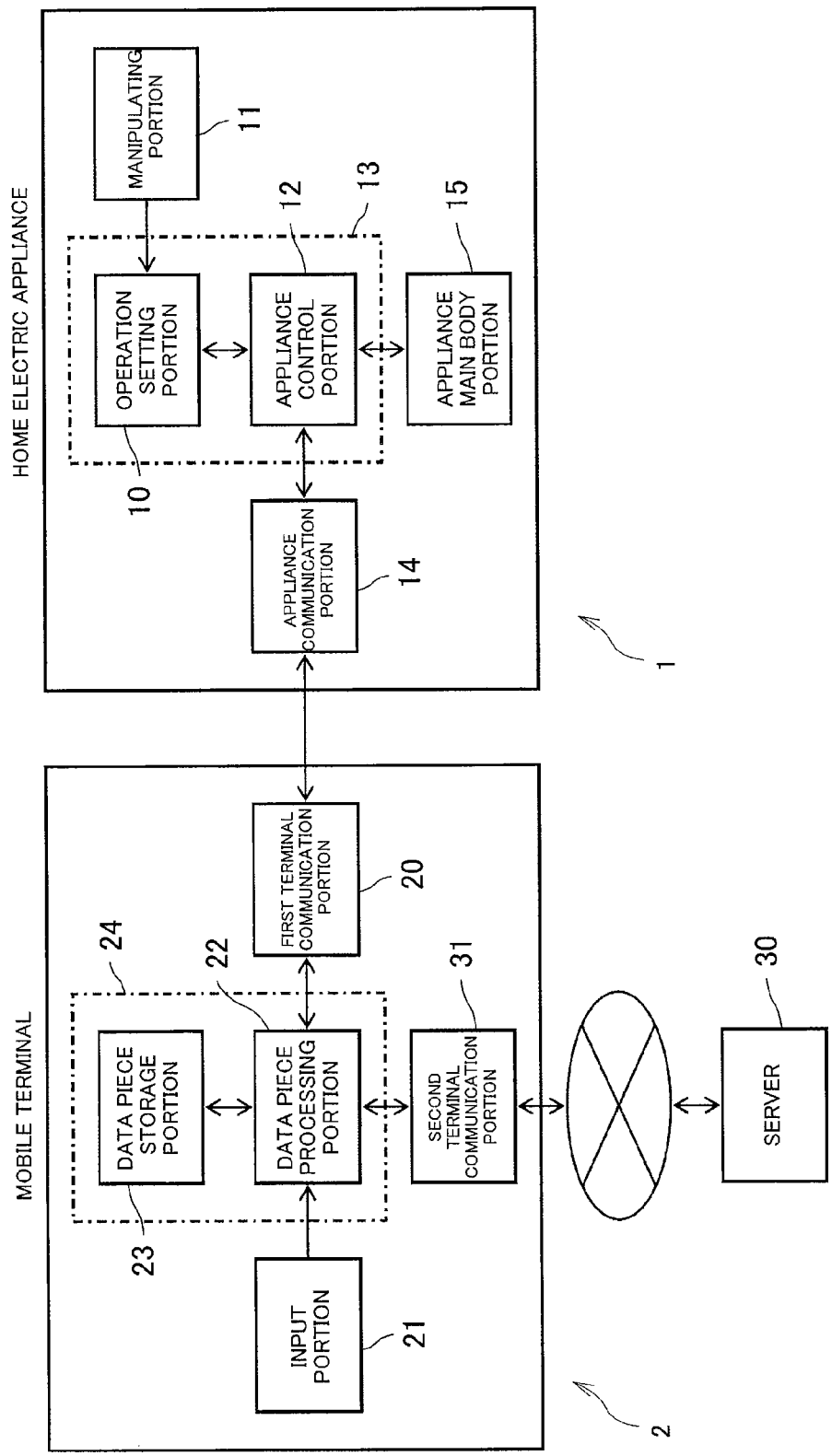
FIG. 7 is a functional block diagram showing the configuration of the home electric appliance operation setting system according to Embodiment 3 of the present invention.

FIG. 7 is a functional block diagram showing the configuration of the home electric appliance operation setting system according to Embodiment 3 of the present invention.

The home electric appliance operation setting system 100 according to Embodiment 3 includes a server 30 that is connected via a network.

The mobile terminal 2 according to Embodiment 3 includes a second terminal communication portion 31 connected to the network.

When the data piece processing portion 22 of the mobile terminal 2 receives the set operation data piece acquisition command from the input portion 21 and receives the set operation data piece and the identification information piece from the home electric appliance 1 through the first terminal communication portion 20, the data piece processing portion 22 causes the received set operation data piece and the received identification information piece to be associated with each other to transmit them to the server 30 through the second terminal communication portion 31 and the network. In a period from when the data piece processing portion 22 receives the set operation data piece and the identification information piece from the home electric appliance 1 until when the data piece processing portion 22 transmits them to the server 30, the data piece processing portion 22 stores the set operation data piece and the identification information piece in a storage portion (a temporary storage portion (not shown), such as the data piece storage portion 23 or a buffer). Therefore, in Embodiment 3, the mobile terminal 2 includes the storage portion that stores the set operation data piece and the identification information piece.

Then, the server 30 receives the operation setting data piece and identification information piece, which have been associated with each other, to store the received operation setting data piece and identification information piece that have been associated with each other.

With this, the set operation data piece can be prevented from being damaged by the malfunction of the mobile terminal 2, or the like.

Embodiment 4

When the appliance communication portion 14 of the home electric appliance 1 according to Embodiment 4 receives the set operation data piece transmission request from the mobile terminal 2, the appliance communication portion 14 encrypts the stored set operation data piece to transmit it.

When the appliance communication portion 14 of the home electric appliance 1 receives the encrypted set operation data piece from the mobile terminal 2, the appliance communication portion 14 decrypts the received, encrypted set operation data piece and causes the operation setting portion 10 to store it. Thus, the appliance communication portion 14 sets the operation, defined by the received set operation data piece, as the operation of the home electric appliance to be executed.

When the data piece processing portion 22 of the mobile terminal 2 according to Embodiment 4 receives the encrypted set operation data piece and the identification information piece from the home electric appliance 1 through the first terminal communication portion 20, the data piece processing portion 22 causes the received, encrypted set operation data piece and the identification information piece to be associated with each other and causes the data piece storage portion 23 to store them.

When the data piece processing portion 22 of the mobile terminal 2 receives the operation setting command from the input portion 21, the data piece processing portion 22 causes the first terminal communication portion 20 to transmit the connection request and causes the first terminal communication portion 20 to transmit both the encrypted set operation data piece and the identification information piece, which have been stored in the data piece storage portion 23 and associated with each other, or only the encrypted set operation data piece. With this, for example, the set operation data piece can be prevented from being rewritten in the mobile terminal 2 whose security is difficult to secure.

Operation Example

Figure 8:
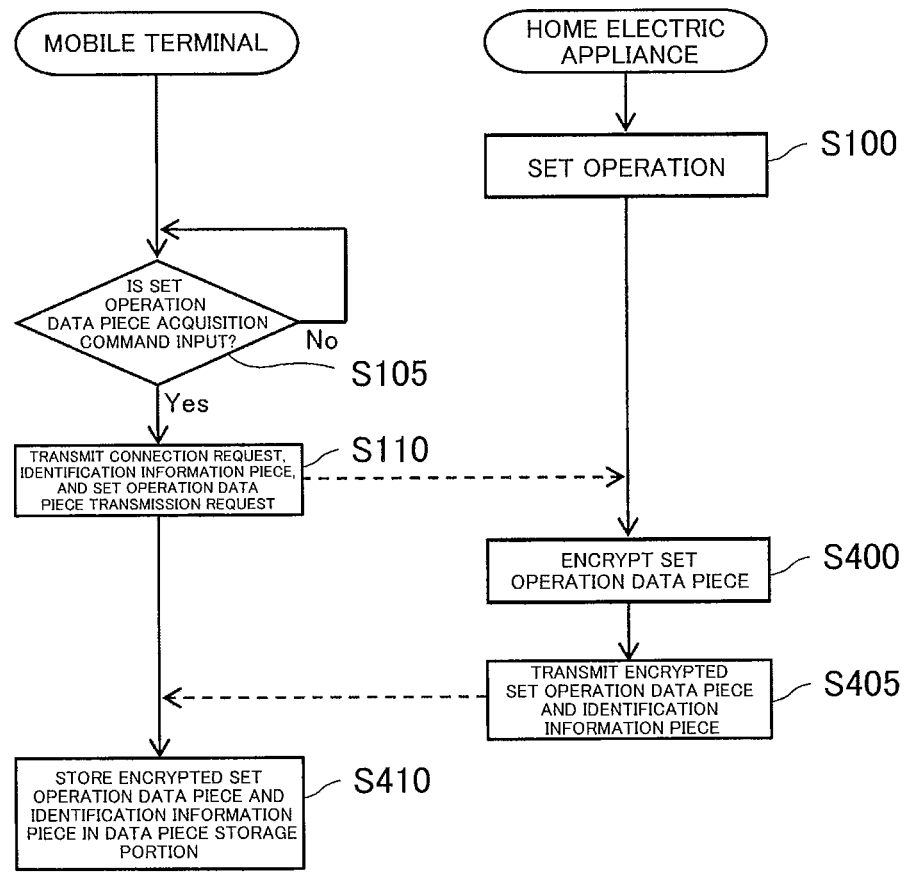
FIG. 8 is a flow chart showing an operation example in a case where the set operation data piece acquisition command is input in the home electric appliance operation setting system according to Embodiment 4 of the present invention.

FIG. 8 is a flow chart showing an operation example in a case where the set operation data piece acquisition command is input in the home electric appliance operation setting system according to Embodiment 4 of the present invention.

First, Steps S100 to S110 are executed in order. Since these steps are the same as Steps S100 to S110 of the above embodiment, the same reference signs are used, and explanations thereof are omitted.

After Step S110, when the appliance communication portion 14 of the home electric appliance 1 receives the set operation data piece transmission request from the mobile terminal 2, the appliance communication portion 14 encrypts the set operation data piece stored in the operation setting portion 10 (Step S400).

Next, the appliance communication portion 14 of the home electric appliance 1 transmits this encrypted set operation data piece (Step S405).

Next, when the data piece processing portion 22 of the mobile terminal 2 receives the set operation data piece and the identification information piece from the home electric appliance 1 through the first terminal communication portion 20, the data piece processing portion 22 causes the received, encrypted set operation data piece and the identification information piece to be associated with each other and causes the data piece storage portion 23 to store them (Step S410).

Figure 9:
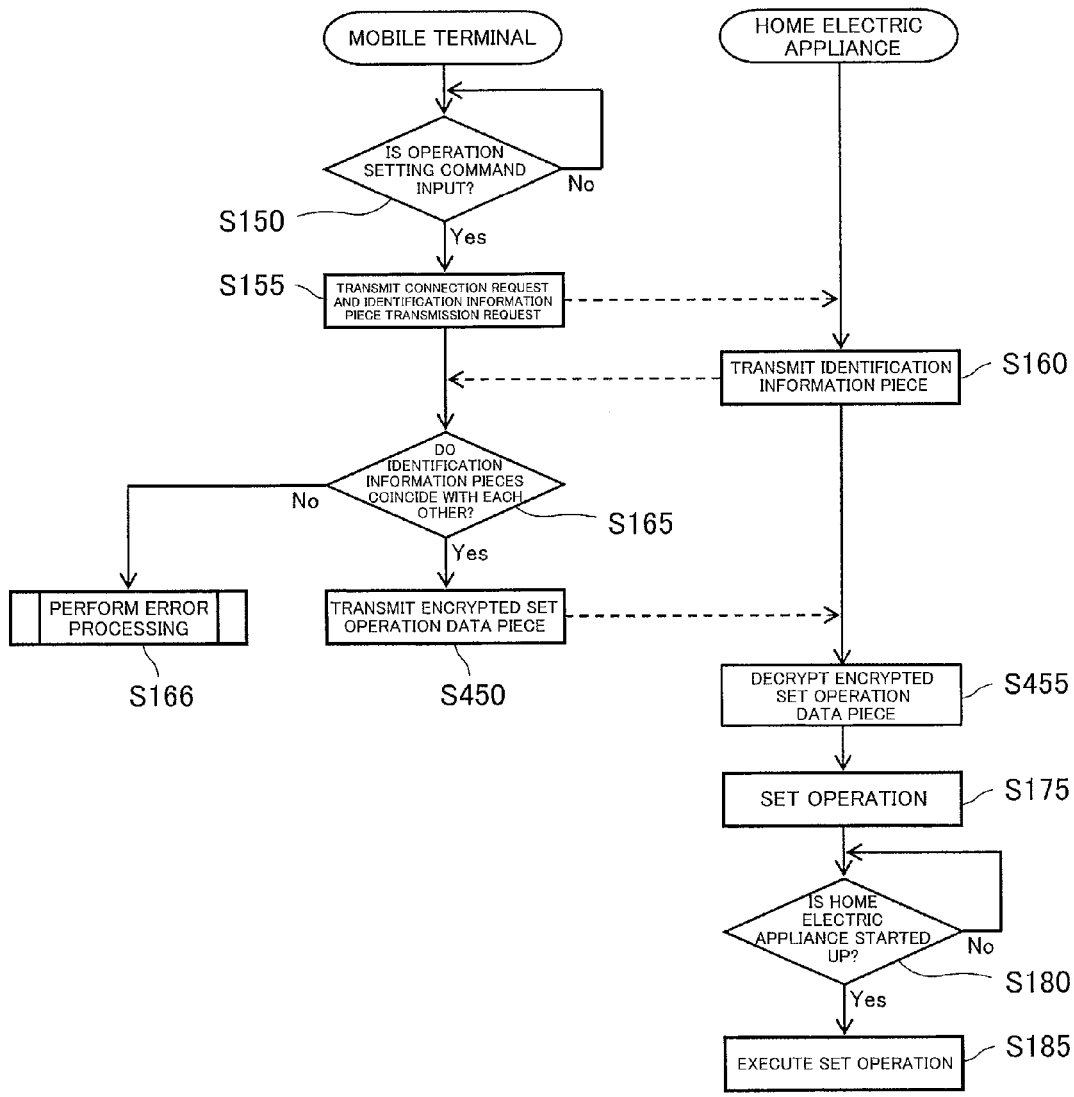
FIG. 9 is a flow chart showing an operation example in a case where the operation setting command is input in the home electric appliance operation setting system according to Embodiment 4 of the present invention.

FIG. 9 is a flow chart showing an operation example in a case where the operation setting command is input in the home electric appliance operation setting system according to Embodiment 4 of the present invention.

Next, an operation example in a case where the operation setting command is input through the input portion 21 of the mobile terminal 2 in the home electric appliance operation setting system 100 configured as above will be explained in reference to FIG. 6.

Since Steps S150 to S165 and Step S166 in Embodiment 4 are the same as those in Embodiment 1, the same reference signs are used, and explanations thereof are omitted.

When the data piece processing portion 22 of the mobile terminal 2 determines in Step S165 that the received identification information piece of the home electric appliance 1 and the identification information piece stored in the data piece storage portion 23 coincide with each other (Yes in Step S165), the data piece processing portion 22 of the mobile terminal 2 causes the first terminal communication portion 20 to transmit the encrypted set operation data piece that has been stored in the data piece storage portion 23 and associated with the identification information piece (Step S450).

Next, when the appliance communication portion 14 of the home electric appliance 1 receives the set operation data piece from the mobile terminal 2, the appliance communication portion 14 decrypts the received, encrypted set operation data piece (Step S455).

Next, by causing the operation setting portion 10 to store the decrypted set operation data piece, the operation defined by the received set operation data piece is set as the operation of the home electric appliance to be executed (Step S460).

After Step S460, Steps S175 to S185 are executed in order. Since these steps are the same as Steps S175 to S185 of Embodiment 1, the same reference signs are used, and explanations thereof are omitted.

Yet Another Embodiment

In the above embodiments, the data piece processing portion 22 of the mobile terminal 2 may be configured to cause the data piece storage portion 23 to store the set operation data piece without recognizing the set operation defined by the set operation data piece. With this, the operation setting can be registered and the registered operation setting can be called up without being influenced by different instruction systems of the home electric appliances 1.

The above embodiments may be combined with one another as long as they do not exclude one another.

Hereinafter, specific examples according to the present invention will be explained in detail in reference to the drawings.

Example 1

Example 1 describes a system configured to perform the operation setting of a washing machine.

Figure 10:
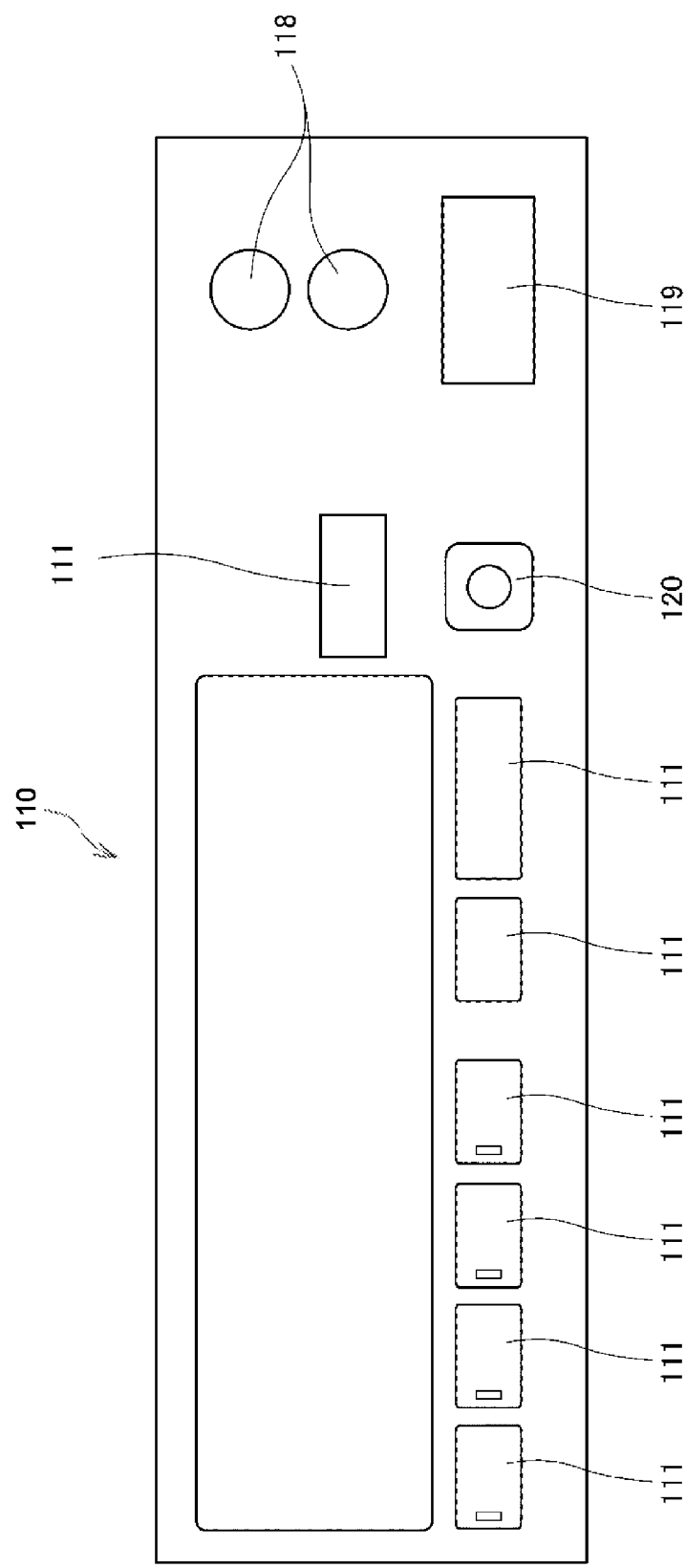
FIG. 10 is a diagram showing a control panel of a washing machine according to Example 1 of the present invention.
Figure 11:
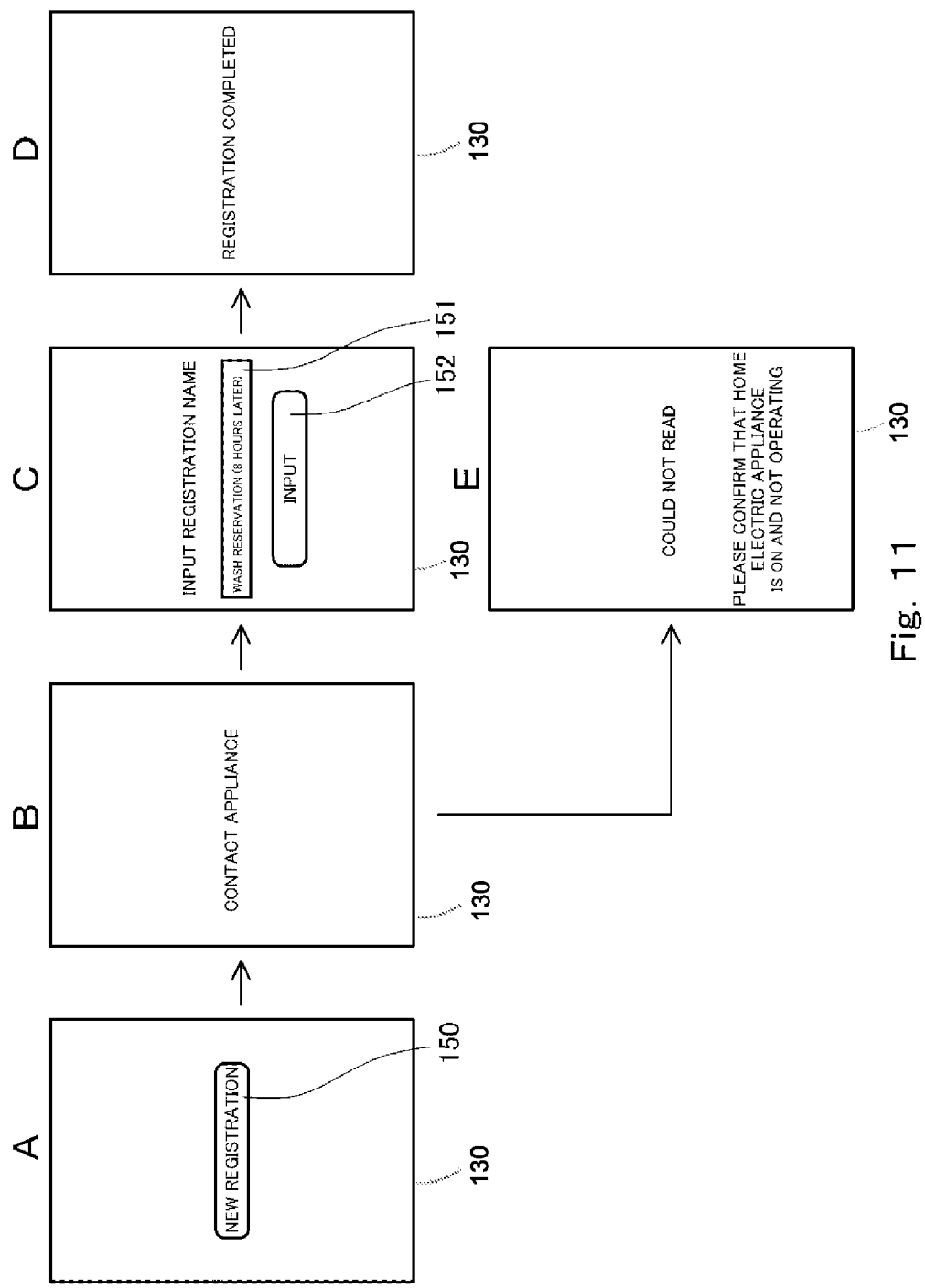
FIG. 11 is a diagram showing a touch panel including an input portion of a mobile terminal according to Example 1 of the present invention and is a diagram showing changes of display images of the touch panel in a case where the set operation data piece acquisition command is input.

FIG. 10 is a diagram showing a control panel 110 of the washing machine (home electric appliance 1) according to Example 1 of the present invention. FIG. 11 is a diagram showing a touch panel 130 including the input portion 21 of the mobile terminal 2 according to Example 1 of the present invention and is a diagram showing changes of display images of the touch panel 130 in a case where the set operation data piece acquisition command is input.

In the present example, the home electric appliance 1 is a washing machine, and the mobile terminal 2 is a mobile phone.

The appliance communication portion 14 of the home electric appliance 1 is a RFID module and is incorporated in the home electric appliance 1. The RFID module behaves as an RF tag from a viewpoint of a below-described external reader/writer whereas it behaves as a temporary storage portion that is used for the data transmission and reception, from a viewpoint of the appliance control portion 12 of the home electric appliance 1.

As shown in FIG. 10, the home electric appliance 1 includes the control panel 110. The control panel 110 includes setting buttons 111, power supply buttons 118, a start-up/temporary stop button 119, and a communication region 120.

The setting buttons 111 constitute the manipulating portion 11 (see FIG. 1). The user manipulates these setting buttons 111 to set the set operation in the operation setting portion 10. In the present example, the set operation set in the operation setting portion 10 is a combination of one or more of an operation mode (only a washing operation, only a drying operation, or both the washing and drying operations), a preset operation content (an automatic washing course, a thorough finish washing course, a blanket washing course, or the like), and settings regarding detail contents of washing, rinsing, dehydrating, and drying operations.

The user manipulates the power supply buttons 118 to turn on or off a power supply of the home electric appliance 1.

The user manipulates the start-up/temporary stop button 119 to start up or temporarily stop the home electric appliance 1.

An antenna of the RFID module of the appliance communication portion 14 is provided inside the communication region 120, and the near field communication can be realized in such a manner that the user causes the mobile terminal 2 to contact the communication region 120.

The first terminal communication portion 20 of the mobile terminal 2 is the external reader/writer configured to write data to the RF tag and read the date from the RF tag and communicates with the appliance communication portion 14 of the home electric appliance 1 via the near field communication.

The mobile terminal 2 includes the touch panel 130. The touch panel 130 constitutes the input portion 21 (see FIG. 1) and also constitutes a display portion configured to inform the user.

A use example in which the set operation data piece is acquired in the home electric appliance operation setting system 100 configured as above will be explained.

First, the operation setting of the home electric appliance 1 is performed.

Next, a program installed in the mobile terminal 2 to perform the operation setting of the home electric appliance 1 is started up. A screen image A in FIG. 11 is an initial screen image of the program to which the set operation data piece acquisition command is input. The initial screen image displays a button 150 which displays "New Registration" and to which the set operation data piece acquisition command is input.

Next, when the user touches the button 150 and immediately separates from the button 150 (hereinafter referred to as "tap"), a screen image B in FIG. 11 is displayed, and the connection request is transmitted from the appliance communication portion 14 of the mobile terminal 2.

Next, when the user causes the first terminal communication portion 20 of the mobile terminal 2 to contact the communication region 120 of the home electric appliance 1, the first terminal communication portion 20 transmits the connection request, the set operation data piece transmission request, and the identification information piece transmission request and receives the set operation data piece and the identification information piece from the home electric appliance 1 as responses to these requests.

When the first terminal communication portion 20 receives the set operation data piece and the identification information piece, a screen image C in FIG. 11 is displayed. This screen image displays: a text box 151 that is an input region of a character information piece; and a button 152 which displays "Input" and sets the character information piece, input to the text box 151, as the set operation data piece identification information piece. The user inputs in the text box 151 matters (in the present example, "Wash Reservation (8 hours later)") used by the user to identify the received set operation data piece. Then, the user taps the button 152. With this, the character information piece input in the text box 151 is set as the set operation data piece identification information piece, and a screen image D in FIG. 11 is displayed to inform the user that the set operation data piece has been stored in the mobile terminal 2.

If the reception of the set operation data piece and the identification information piece is failed, a screen image E in FIG. 11 is displayed.

Next, a use example in a case where the operation setting is performed will be explained.

Figure 12:
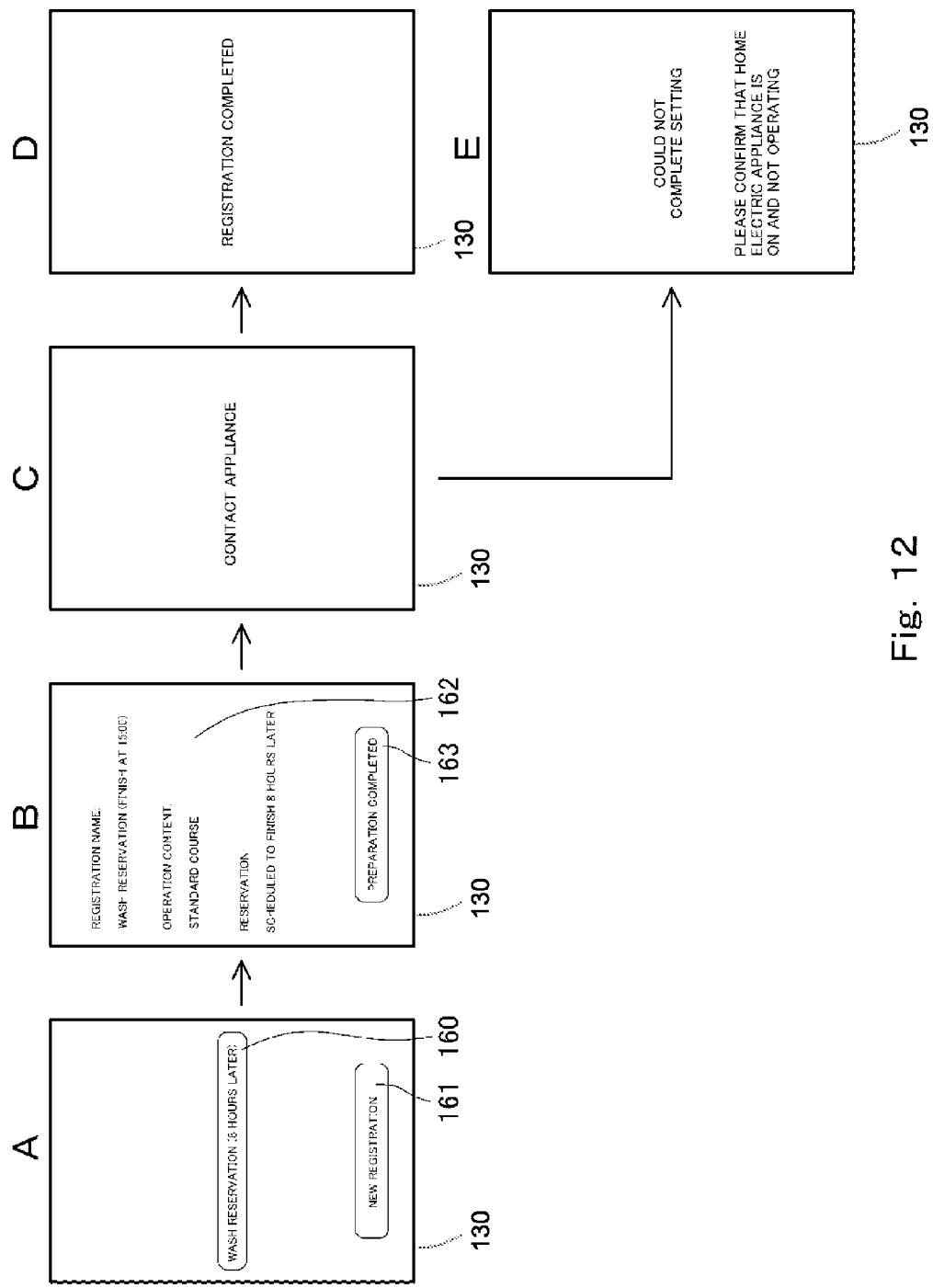
FIG. 12 is a diagram showing the touch panel including the input portion of the mobile terminal according to Example 1 of the present invention and is a diagram showing the changes of the display images of the touch panel in a case where the operation setting command is input.

FIG. 12 is a diagram showing the touch panel 130 including the input portion 21 of the mobile terminal 2 according to Example 1 of the present invention and is a diagram showing changes of the display images of the touch panel 130 in a case where the operation setting command is input.

A screen image A in FIG. 12 is the initial screen image to which the operation setting command of the mobile terminal 2 is input. The initial screen image displays: a button 160 that displays the set operation data piece identification information piece (in the present example, "Wash Reservation (8 hours later)"); and a button 161 which displays "New Registration" and to which the set operation data piece acquisition command is input. The button 160 is a button to which the operation setting command is input. The button 161 is a button to which the set operation data piece acquisition command is input. When the user taps the button 161, a screen image B in FIG. 12 is displayed. The subsequent operations are the same as above, so that explanations thereof are omitted.

Next, when the user taps the button 160, the screen image B in FIG. 12 is displayed. This screen image displays: a region 162 that displays information based on the set operation data piece identification information piece; and a button 163 that displays "Preparation Completed".

Next, when the user confirms the matters displayed on the region 162 and then taps the button 163, a screen image C in FIG. 12 is displayed, and the connection request is transmitted from the appliance communication portion 14 of the mobile terminal 2.

Next, when the user causes the first terminal communication portion 20 of the mobile terminal 2 to contact the communication region 120 of the home electric appliance 1, it is confirmed that the identification information piece stored in the data piece storage portion 23 of the mobile terminal 2 and the identification information piece of the home electric appliance 1 coincide with each other, and then, the set operation data piece is transmitted to the home electric appliance 1. When the set operation data piece is set in the operation setting portion 10 of the home electric appliance 1, the completion of the setting of the set operation data piece in the operation setting portion 10 is informed in response to the transmission of the set operation data piece. Thus, a screen image D in FIG. 12 is displayed. With this, the user is informed of the completion of the setting of the set operation data piece in the home electric appliance 1.

Then, when the start-up/temporary stop button 119 is pushed down, the set operation is executed by the control of the appliance control portion 12 in accordance with the set operation data piece that has been set.

Example 2

Example 2 describes a system configured to perform the operation setting of a lighting device.

First, the following will explain the configurations of the present example and mainly explain differences between the present example and Example 2.

In the present example, the home electric appliance 1 is a lighting device, and the mobile terminal 2 is a mobile phone as with Example 1. The lighting device includes a remote controller that is wirelessly connected to a lighting device main body.

Figure 13:
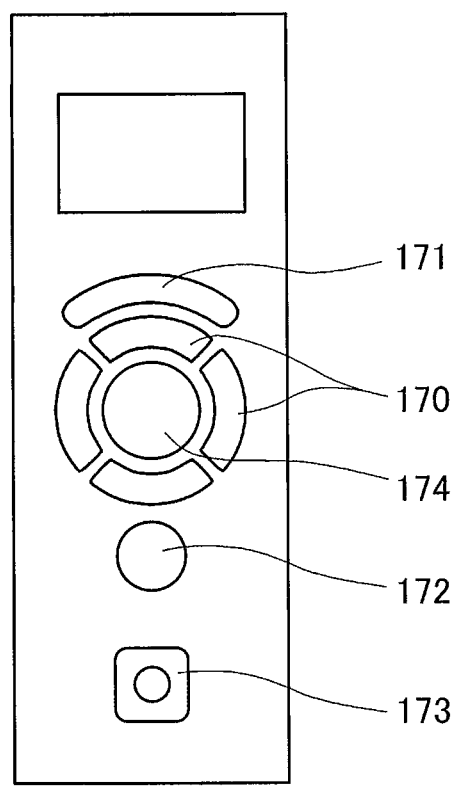
FIG. 13 is a diagram showing a remote controller of a lighting device according to Example 2 of the present invention.

FIG. 13 is a diagram showing the remote controller of the lighting device (home electric appliance 1) according to Example 2 of the present invention.

As shown in FIG. 13, the remote controller of the home electric appliance 1 includes four preset power supply ON buttons 170, a light color adjustment button 171, a brightness adjustment button 174, a power supply OFF button 172, and a communication region 173.

When each of these four preset power supply ON buttons 170 is pushed down, the lighting device is turned on to emit a preset light color.

When the light color adjustment button 171 is pushed down in a state where the lighting device is in the on state, the light color of the lighting device is changed.

When the brightness adjustment button 174 is pushed down in a state where the lighting device is in the on state, the brightness of the lighting device is changed.

When the power supply OFF button 172 is pushed down, the lighting device is turned off.

Since the communication region 173 is the same in configuration as the communication region 120 of Example 1, an explanation thereof is omitted.

Next, the following will explain a use example of the present example and mainly explain differences between the present example and Example 1.

When acquiring the set operation data piece, the operation setting of the home electric appliance 1 is performed by using the light color adjustment button 171 and the brightness adjustment button 174. In the present example, the set operation set in the operation setting portion 10 is the light color and brightness of the lighting device. In the present example, in a state where the lighting device is in the on state, that is, in a state where the home electric appliance 1 is being started up, the set operation is set in the operation setting portion 10. With this, the operation setting can be performed while confirming the light color and brightness of the lighting device. The other specific setting steps when acquiring the set operation data piece is the same as that in Example 1, so that a detailed explanation thereof is omitted.

Next, in the operation setting, when the user causes the first terminal communication portion 20 of the mobile terminal 2 to contact the communication region 120 of the home electric appliance 1 in a state where the lighting device is in the off state, the lighting device is turned on to emit the set light color and brightness. When the user causes the first terminal communication portion 20 of the mobile terminal 2 to get close to or contact the communication region 120 of the home electric appliance 1 in a state where the lighting device is in the on state, the light color and brightness are changed to the set light color and brightness.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The home electric appliance operation setting system of the present invention is useful as a system used for the operation setting of the home electric appliance.

The invention claimed is:

1. A communication method of communicating with one or more home electric appliances via near field communication, comprising:
receiving a set operation data piece acquisition command from a user;
when the set operation data piece acquisition command is received, transmitting a request to a home electric appliance for a set operation data piece that is a data piece that defines a custom operation set manually in the home electric appliance as an operation to be executed by the home electric appliance;
receiving from the home electric appliance the set operation data piece corresponding to the request;
storing the received set operation data piece in a storage device;

receiving an operation setting command from the user; and when the operation setting command is received, transmitting to the home electric appliance the set operation data piece stored in the storage device.

2. The communication method according to claim 1, further comprising:

when receiving the set operation data piece, further receiving from the home electric appliance an identification information piece of the home electric appliance;

associating the received set operation data piece with the received identification information piece;

storing the received identification information piece associated with the received set operation data piece in the storage device.

3. The communication method according to claim 2, further comprising:

when the operation setting command is received, confirming whether or not the stored identification information piece associated with the stored set operation data piece coincides with the identification information piece of the home electric appliance, wherein the stored set operation data piece is transmitted to the home electric appliance when the operation setting command is received and the identification information piece associated with the set operation data piece coincides with the identification information piece of the home electric appliance.

4. The communication method according to claim 1, further comprising:

receiving the operation setting command together with a selection information piece that selects the stored set operation data piece;

when the operation setting command together with the selection information piece is received, transmitting to the home electric appliance the stored set operation data piece selected based on the operation setting command input together with the selection information piece.

5. The communication method according to claim 2, further comprising:

receiving a set operation data piece identification information piece that allows the user to identify the received set operation data piece; and associating the received set operation data piece, the received identification information piece, and the received set operation data piece identification information piece with one another to store them in the storage device.

6. The communication method according to claim 1, further comprising:

connecting to a server via a network; and when receiving the set operation data piece from the home electric appliance, transmitting the received set operation data piece to the server.

7. A non-transitory computer readable program storage medium storing a computer program executable by a processor of a mobile terminal, the mobile terminal being configured to communicate with one or more home electric appliances via near field communication, to perform operations comprising:

receiving a set operation data piece acquisition command from a user;

when the set operation data piece acquisition command is received, transmitting a request to a home electric appliance for a set operation data piece that is a data piece that defines a custom operation set manually in the home electric appliance as an operation to be executed by the home electric appliance;

receiving from the home electric appliance the set operation data piece corresponding to the request;

storing the received set operation data piece in a storage portion included in the mobile terminal;

receiving an operation setting command from the user; and when the operation setting command is received, transmitting to the home electric appliance the set operation data piece stored in the storage portion.

8. A mobile terminal configured to connect to one or more home electric appliances via near field communication, comprising:

a first terminal communication portion configured to communicate with an appliance communication portion of a home electric appliance via near field communication;

an input portion configured to receive a set operation data piece acquisition command and an operation setting command from a user;

a data piece storage portion configured to store data pieces; and a data piece processing portion configured to when receiving the set operation data piece acquisition command from the input portion, cause the first terminal communication portion to request transmission of a set operation data piece to the home electric appliance, the set operation data piece being a data piece that defines a custom operation set manually in the home electric appliance as an operation to be executed by the home electric appliance, when receiving the set operation data piece corresponding to the request from the home electric appliance through the first terminal communication portion, cause the data piece storage portion to store the received set operation data piece, and when receiving the operation setting command from the input portion, cause the first terminal communication portion to transmit to the home electric appliance the set operation data piece stored in the data piece storage portion.

9. A home electric appliance configured to connect to a mobile terminal via near field communication, comprising:

an operation setting portion configured to store a set operation data piece that is a data piece that defines a custom operation (set operation) set manually in the home electric appliance as an operation to be executed by the home electric appliance;

a manipulating portion configured to be manipulated by a user to cause the operation setting portion to set the set operation;

an appliance control portion configured to cause the home electric appliance to execute the set operation; and an appliance communication portion configured to receive a set operation data piece transmission request from a mobile terminal via near field communication, when the set operation data piece transmission request is received from the mobile terminal via near field communication, transmit the set operation data piece stored in the operation setting portion, receive the set operation data piece from the mobile terminal, and when the set operation data piece is received from the mobile terminal, cause the operation setting portion to set the operation, defined by the received set operation data piece, as the operation of the home electric appliance to be executed.

10. The home electric appliance according to claim 9, wherein the appliance communication portion is further configured to transmit an identification information piece of the home electric appliance when the set operation data piece transmission request is received.

11. The home electric appliance according to claim 10, wherein the appliance communication portion is further configured to:
when receiving the set operation data piece, receive an identification information piece associated with the received set operation data piece;
confirm whether or not the received identification information piece and the identification information piece of the home electric appliance coincide with each other; and
when the received identification information piece and the identification information piece of the home electric appliance coincide with each other, cause the operation setting portion to store the received set operation data piece so as to cause the operation setting portion to set the operation, defined by the received set operation data piece, as the operation of the home electric appliance to be executed when the set operation data piece is received from the mobile terminal and the received identification information piece and the identification information piece of the home electric appliance coincide with each other.

12. A home electric appliance operation setting system comprising:
a home electric appliance; and
a mobile terminal connected to the home electric appliance via near field communication,
wherein the home electric appliance includes
an operation setting portion configured to store a set operation data piece that is a data piece that defines a custom operation (set operation) set manually in the home electric appliance as an operation to be executed by the home electric appliance,
a manipulating portion configured to be manipulated by a user to cause the operation setting portion to set the set operation,
an appliance control portion configured to cause the home electric appliance to execute the set operation, and
an appliance communication portion configured to communicate with a first terminal communication portion of the mobile terminal via the near field communication,
wherein the mobile terminal includes
the first terminal communication portion configured to communicate with the appliance communication portion of the home electric appliance via the near field communication,
an input portion to which the user inputs a set operation data piece acquisition command and an operation setting command,
a data piece processing portion configured to process data pieces depending on the set operation data piece acquisition command or the operation setting command input through the input portion, and
a data piece storage portion configured to store the data pieces processed by the data piece processing portion,
wherein the data piece processing portion is configured such that when the data piece processing portion of the mobile terminal receives the set operation data piece acquisition command from the input portion, the data piece processing portion causes the first terminal communication portion to transmit a set operation data piece transmission request,
wherein the appliance communication portion is configured such that when the appliance communication portion of the home electric appliance receives the set operation data piece transmission request from the mobile terminal, the appliance communication portion transmits the set operation data piece stored in the operation setting portion,
wherein the data piece processing portion is further configured such that when the data piece processing portion of the mobile terminal receives the set operation data piece from the home electric appliance through the first terminal communication portion, the data piece processing portion causes the data piece storage portion to store the received set operation data piece,
wherein the data piece processing portion is further configured such that when the data piece processing portion of the mobile terminal receives the operation setting command from the input portion, the data piece processing portion causes the first terminal communication portion to transmit the set operation data piece stored in the data piece storage portion, and
wherein the appliance communication portion is further configured such that when the appliance communication portion of the home electric appliance receives the set operation data piece from the mobile terminal, the appliance communication portion causes the operation setting portion to set the operation, defined by the received set operation data piece, as the operation of the home electric appliance to be executed.

13. The home electric appliance operation setting system according to claim 12, wherein:
the appliance communication portion is further configured such that when the appliance communication portion of the home electric appliance transmits the set operation data piece stored in the operation setting portion, the appliance communication portion transmits an identification information piece of the home electric appliance to which the appliance communication portion belongs;
the data piece processing portion is further configured such that the data piece processing portion of the mobile terminal causes the set operation data piece to be associated with the identification information piece and causes the data piece storage portion to store them;
the data piece processing portion is further configured such that the data piece processing portion of the mobile terminal confirms at the time of transmission that the identification information piece associated with the set operation data piece received by the appliance communication portion and stored in the operation setting portion coincides with the identification information piece of the home electric appliance to which the appliance communication portion belongs; and
the data piece processing portion is further configured such that when the identification information piece, received from the appliance communication portion, of the home electric appliance to which the appliance communication portion belongs and the identification information piece associated with the set operation data piece to be transmitted coincide with each other, the data piece processing portion of the mobile terminal transmits the set operation data piece.

14. The home electric appliance operation setting system according to claim 12, wherein:
the appliance communication portion is further configured such that when the appliance communication portion of the home electric appliance transmits the set operation data piece stored in the operation setting portion, the appliance communication portion further transmits an identification information piece of the home electric appliance to which the appliance communication portion belongs;
the data piece processing portion is further configured such that the data piece processing portion of the mobile terminal causes the set operation data piece to be associated with the identification information piece and causes the data piece storage portion to store them;
the data piece processing portion is further configured such that when the data piece processing portion of the mobile terminal causes the first terminal communication portion to transmit the set operation data piece stored in the data piece storage portion, the data piece processing portion further transmits the identification information piece associated with the set operation data piece;
the appliance communication portion is further configured such that the appliance communication portion confirms at the time of reception that the identification information piece associated with the set operation data piece received by the appliance communication portion and stored in the operation setting portion coincides with the identification information piece of the home electric appliance to which the appliance communication portion belongs; and
the appliance communication portion is further configured such that when the identification information piece received by the appliance communication portion together with the set operation data piece coincides with the identification information piece of the home electric appliance to which the appliance communication portion belongs, the appliance communication portion causes the operation setting portion to store the received set operation data piece so as to cause the operation setting portion to set the operation, defined by the received set operation data piece, as the operation of the home electric appliance to be executed when the appliance communication portion of the home electric appliance receives the set operation data piece from the mobile terminal and the identification information piece received by the appliance communication portion together with the set operation data piece coincides with the identification information piece of the home electric appliance to which the appliance communication portion belongs.

15. The home electric appliance operation setting system according to claim 12, wherein:
the input portion of the mobile terminal is configured to receive the operation setting command together with a selection information piece that selects the set operation data piece stored in the data piece storage portion; and
when the data piece processing portion of the mobile terminal receives from the input portion the set operation data piece acquisition command together with the selection information piece, the data piece processing portion causes the first terminal communication portion to transmit the set operation data piece selected based on the selection information piece from the data pieces stored in the data piece storage portion.

16. The home electric appliance operation setting system according to claim 15, wherein:
the input portion is configured to receive a set operation data piece identification information piece that allows the user to identify the set operation data piece stored in the data piece storage portion; and
the data piece processing portion is further configured such that the data piece processing portion of the mobile terminal is configured to cause the received set operation data piece, the received identification information piece, and the set operation data piece identification information piece, received from the input portion, to be associated with one another and cause the data piece storage portion to store them.

17. The home electric appliance operation setting system according to claim 12, wherein:
the appliance communication portion of the home electric appliance is configured such that
when the appliance communication portion receives the set operation data piece transmission request from the mobile terminal, the appliance communication portion encrypts the stored set operation data piece to transmit it, and
when the appliance communication portion receives the encrypted set operation data piece from the mobile terminal, the appliance communication portion decrypts the received, encrypted set operation data piece and causes the operation setting portion to store it to set the operation, defined by the received set operation data piece, as the operation of the home electric appliance to be executed; and
the data piece processing portion of the mobile terminal is configured such that
when the data piece processing portion receives the encrypted set operation data piece from the home electric appliance through the first terminal communication portion, the data piece processing portion causes the data piece storage portion to store the received, encrypted set operation data piece, and
when the data piece processing portion receives the operation setting command from the input portion, the data piece processing portion causes the first terminal communication portion to transmit the encrypted set operation data piece stored in the data piece storage portion.

18. The home electric appliance operation setting system according to claim 12, further comprising a server connected via a network, wherein:
the mobile terminal includes a second terminal communication portion connected to the network;
the data piece processing portion is further configured such that when the data piece processing portion of the mobile terminal receives the set operation data piece from the home electric appliance through the first terminal communication portion, the data piece processing portion transmits the set operation data piece to the server through the second terminal communication portion and the network; and
the server is configured such that when the server receives the set operation data piece, the server stores the set operation data piece.

* * * * *